(12) United States Patent
Schubart et al.

(10) Patent No.: US 11,993,121 B1
(45) Date of Patent: May 28, 2024

(54) PITCH AND ROLL CONTROL SYSTEM FOR A VEHICLE

(71) Applicant: Oshkosh Corporation, Oshkosh, WI (US)

(72) Inventors: Kai P. Schubart, Oshkosh, WI (US); Christopher J. Rukas, Oshkosh, WI (US); Erik S. Ellifson, Oshkosh, WI (US); Aaron J. Rositch, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/101,445

(22) Filed: Jan. 25, 2023

Related U.S. Application Data

(63) Continuation of application No. 16/723,380, filed on Dec. 20, 2019, now Pat. No. 11,584,185.

(60) Provisional application No. 62/784,153, filed on Dec. 21, 2018, provisional application No. 62/784,174, filed on Dec. 21, 2018.

(51) Int. Cl.
*B60G 17/016* (2006.01)
*B60G 17/018* (2006.01)
*B60G 17/08* (2006.01)

(52) U.S. Cl.
CPC ......... *B60G 17/018* (2013.01); *B60G 17/016* (2013.01); *B60G 17/08* (2013.01); *B60G 2400/0531* (2013.01); *B60G 2400/0533* (2013.01); *B60G 2400/102* (2013.01); *B60G 2400/1062* (2013.01); *B60G 2400/51* (2013.01); *B60G 2800/012* (2013.01)

(58) Field of Classification Search
CPC .... B60G 17/0162; B60G 13/08; B60G 17/08; B60G 2202/24; B60G 2202/413; B60G 2400/0521; B60G 2400/0522; B60G 2400/0523; B60G 2400/053; B60G 2400/10; B60G 2400/204; B60G 2400/41
See application file for complete search history.

(56) References Cited

U.S. PATENT DOCUMENTS

| | | |
|---|---|---|
| 5,119,297 A | 6/1992 | Buma et al. |
| 5,149,131 A | 9/1992 | Sugasawa et al. |
| 5,162,995 A | 11/1992 | Ikemoto et al. |
| 5,176,399 A | 1/1993 | Takehara et al. |
| 5,177,681 A | 1/1993 | Sato |
| 5,540,298 A | 7/1996 | Yoshioka et al. |
| 5,740,039 A | 4/1998 | Hirahara et al. |

(Continued)

*Primary Examiner* — Toan C To
(74) *Attorney, Agent, or Firm* — Foley & Lardner LLP

(57) ABSTRACT

A vehicle includes a suspension system having a first damper, a second damper, valves and a controller. Each of the first damper and the second damper include a housing and a piston sealingly interfaced with an inner diameter of the housing, dividing the damper into a first and second chamber. Each valve controls flow rate of fluid entering or exiting at least one of the first and second chamber of at least one of the first damper and the second damper. The controller controls the valves to control extension or compression of at least one of the first damper and the second damper based on at least one of a degree of roll of the vehicle during a turn of the vehicle and a degree of pitch of the vehicle during acceleration of the vehicle or a degree of pitch of the vehicle during deceleration of the vehicle.

4 Claims, 17 Drawing Sheets

(56) References Cited

U.S. PATENT DOCUMENTS

| | | | | |
|---|---|---|---|---|
| 5,794,966 A | * | 8/1998 | MacLeod | B60G 21/073 280/5.507 |
| 6,196,555 B1 | * | 3/2001 | Gaibler | B60G 17/0523 280/6.154 |
| 6,266,598 B1 | | 7/2001 | Pillar et al. | |
| 6,318,742 B2 | * | 11/2001 | Franzini | B60G 21/06 280/5.506 |
| 6,421,593 B1 | | 7/2002 | Kempen et al. | |
| 6,553,290 B1 | | 4/2003 | Pillar | |
| 6,757,597 B2 | | 6/2004 | Yakes et al. | |
| 6,885,920 B2 | | 4/2005 | Yakes et al. | |
| 6,909,944 B2 | | 6/2005 | Pillar et al. | |
| 6,922,615 B2 | | 7/2005 | Pillar et al. | |
| 6,993,421 B2 | | 1/2006 | Pillar et al. | |
| 7,006,902 B2 | | 2/2006 | Archer et al. | |
| 7,024,296 B2 | | 4/2006 | Squires et al. | |
| 7,072,745 B2 | | 7/2006 | Pillar et al. | |
| 7,107,129 B2 | | 9/2006 | Rowe et al. | |
| 7,127,331 B2 | | 10/2006 | Pillar et al. | |
| 7,162,332 B2 | | 1/2007 | Pillar et al. | |
| 7,164,977 B2 | | 1/2007 | Yakes et al. | |
| 7,184,862 B2 | | 2/2007 | Pillar et al. | |
| 7,184,866 B2 | | 2/2007 | Squires et al. | |
| 7,254,468 B2 | | 8/2007 | Pillar et al. | |
| 7,274,976 B2 | | 9/2007 | Rowe et al. | |
| 7,277,782 B2 | | 10/2007 | Yakes et al. | |
| 7,302,320 B2 | | 11/2007 | Nasr et al. | |
| 7,392,122 B2 | | 6/2008 | Pillar et al. | |
| 7,413,063 B1 | | 8/2008 | Davis | |
| 7,522,979 B2 | | 4/2009 | Pillar | |
| 7,555,369 B2 | | 6/2009 | Pillar et al. | |
| 7,689,332 B2 | | 3/2010 | Yakes et al. | |
| 7,711,460 B2 | | 5/2010 | Yakes et al. | |
| 7,715,962 B2 | | 5/2010 | Rowe et al. | |
| 7,751,959 B2 | | 7/2010 | Boon et al. | |
| 7,756,621 B2 | | 7/2010 | Pillar et al. | |
| 7,831,363 B2 | | 11/2010 | Quigley | |
| 8,095,247 B2 | | 1/2012 | Pillar et al. | |
| 8,333,390 B2 | | 12/2012 | Linsmeier et al. | |
| 8,465,025 B2 | | 6/2013 | Venton-Walters et al. | |
| 8,596,648 B2 | | 12/2013 | Venton-Walters et al. | |
| 8,764,029 B2 | | 7/2014 | Venton-Walters et al. | |
| 8,801,017 B2 | | 8/2014 | Ellifson et al. | |
| 8,821,130 B2 | | 9/2014 | Venton-Walters et al. | |
| 8,876,133 B2 | | 11/2014 | Ellifson | |
| 8,960,697 B2 | * | 2/2015 | Kato | B60G 21/073 280/5.506 |
| 8,991,834 B2 | | 3/2015 | Venton-Walters et al. | |
| 9,062,983 B2 | | 6/2015 | Zych | |
| 9,127,738 B2 | | 9/2015 | Ellifson et al. | |
| 9,174,686 B1 | | 11/2015 | Messina et al. | |
| 9,291,230 B2 | | 3/2016 | Ellifson et al. | |
| 9,303,715 B2 | | 4/2016 | Dillman et al. | |
| 9,327,576 B2 | | 5/2016 | Ellifson | |
| 9,581,153 B2 | | 2/2017 | Venton-Walters et al. | |
| 9,688,112 B2 | | 6/2017 | Venton-Walters et al. | |
| 9,707,869 B1 | | 7/2017 | Messina et al. | |
| 9,765,841 B2 | | 9/2017 | Ellifson et al. | |
| 9,809,080 B2 | | 11/2017 | Ellifson et al. | |
| 9,944,145 B2 | | 4/2018 | Dillman et al. | |
| 10,030,737 B2 | | 7/2018 | Dillman et al. | |
| 10,178,863 B2 | * | 1/2019 | Schnaider | B05B 1/205 |
| 10,343,481 B2 | * | 7/2019 | Fredriksson | B60G 9/00 |
| 10,350,956 B2 | | 7/2019 | Dillman et al. | |
| 10,369,860 B2 | | 8/2019 | Ellifson et al. | |
| 10,414,385 B2 | | 9/2019 | Linsmeier et al. | |
| 10,421,332 B2 | | 9/2019 | Venton-Walters et al. | |
| 10,422,403 B2 | | 9/2019 | Ellifson et al. | |
| 10,828,955 B1 | | 11/2020 | Edren et al. | |
| 11,192,424 B2 | | 12/2021 | Tabata et al. | |
| 11,529,836 B1 | * | 12/2022 | Schubart | B60G 13/08 |
| 11,584,185 B1 | * | 2/2023 | Schubart | B60G 21/073 |
| 2005/0082127 A1 | | 4/2005 | Barber et al. | |
| 2006/0287791 A1 | * | 12/2006 | Boon | B60G 21/106 701/37 |
| 2008/0140285 A1 | | 6/2008 | Sekiya | |
| 2009/0020966 A1 | * | 1/2009 | Germain | B60G 21/0555 280/124.106 |
| 2009/0037051 A1 | | 2/2009 | Shimizu et al. | |
| 2009/0140501 A1 | * | 6/2009 | Taylor | B60G 21/06 280/5.508 |
| 2009/0174158 A1 | * | 7/2009 | Anderson | B60G 21/073 280/124.16 |
| 2011/0187065 A1 | * | 8/2011 | Van Der Knaap | B60G 17/08 280/5.507 |
| 2014/0232082 A1 | * | 8/2014 | Oshita | B60G 17/0162 280/124.161 |
| 2017/0240017 A1 | * | 8/2017 | Vandersmissen | B60G 17/06 |
| 2017/0305226 A1 | | 10/2017 | Okimura | |
| 2018/0250999 A1 | | 9/2018 | Golin | |
| 2019/0178329 A1 | | 6/2019 | Dumitru et al. | |
| 2019/0359025 A1 | | 11/2019 | Wager | |
| 2019/0381850 A1 | | 12/2019 | Hoult | |
| 2020/0039314 A1 | | 2/2020 | Minakuchi et al. | |
| 2020/0156430 A1 | | 5/2020 | Oakden-Graus et al. | |
| 2020/0223274 A1 | | 7/2020 | Tucker et al. | |

* cited by examiner

PITCH AND ROLL CONTROL SYSTEM FOR A VEHICLE

CROSS-REFERENCE TO RELATED APPLICATIONS

This application is a continuation of U.S. application Ser. No. 16/723,380, filed Dec. 20, 2019 which claims the benefit of and priority to U.S. Provisional Patent Application No. 62/784,174, filed Dec. 21, 2018, and U.S. Provisional Patent Application No. 62/784,153, filed, Dec. 21, 2018, both of which are hereby incorporated by reference in their entireties.

BACKGROUND

Suspension systems traditionally couple a body of a vehicle to one or more axles. Such suspension systems may include solid axle suspension systems or independent suspension systems, among others. Independent suspension systems facilitate independent wheel movement as the vehicle encounters one or more obstacles (e.g., uneven terrain, potholes, curbs, etc.). The independent suspension system reduces the forces experienced by passengers as the vehicle encounters the obstacles. Independent suspension systems include one or more arms (e.g., A-arms, swing arms, etc.) that are coupled to a hub, to which a wheel and tire assembly is attached. Various suspension components are coupled to the arms and the body of the vehicle.

SUMMARY

One implementation of the present disclosure is a vehicle. In some embodiments, the vehicle includes a suspension system. The suspension system includes a first damper, a second damper, valves, and a controller, according to some embodiments. Each of the first damper and the second damper include a housing and a piston configured to sealingly interface with an inner diameter of the housing and divide the damper into a first chamber and a second chamber according to some embodiments. Each of the valves are configured to control a volumetric flow rate of fluid entering or exiting at least one of the first chamber and the second chamber of at least one of the first damper and the second damper, according to some embodiments. The controller is configured to control the valves to control extension or compression of at least one of the first damper and the second damper based on at least one of (a) a degree of roll of the vehicle during a turn of the vehicle, (b) a degree of pitch of the vehicle during acceleration of the vehicle, or (c) a degree of pitch of the vehicle during deceleration of the vehicle according to some embodiments. In some embodiments, the first damper and the second damper are configured to control at least one of a roll of the vehicle and a pitch of the vehicle.

Another implementation of the present disclosure is a method for improving ride stability of a vehicle. In some embodiments, the method includes receiving one or more inputs relating to a dynamic condition of the vehicle. In some embodiments, the method includes determining a dynamic state of the vehicle based on the one or more inputs relating to the dynamic condition of the vehicle. In some embodiments, the method includes determining an extension or compression of one or more dampers of the vehicle to achieve at least one of a desired roll or pitch of the vehicle according to a first mode of operation. In some embodiments, the method includes determining an operation of one or more valves configured to control an output flow rate of extending ones of the one or more dampers of the vehicle to achieve at the at least one of the desired roll or the desired pitch of the vehicle according to the first mode of operation. In some embodiments, the method includes adjusting the operation of the one or more valves to achieve the desired roll or the desired pitch of the vehicle by controlling the output flow rate of the extending ones of the one or more dampers.

Another implementation of the present disclosure is a suspension system for a vehicle. The suspension system includes dampers and a controller, according to some embodiments. In some embodiments, the dampers are configured to extend and compress based on at least one of a yaw rate and an acceleration of the vehicle. In some embodiments, each of the dampers includes a valve configured to control at least one of the extension or the compression of one of the plurality of dampers by controlling a fluid flow rate of one of the dampers. In some embodiments, the controller is configured to adjust an operation of at least one of the valves to control at least one of the extension or compression of at least one of the dampers to achieve at least one of a desired roll and a desired pitch.

BRIEF DESCRIPTION OF THE DRAWINGS

The disclosure will become more fully understood from the following detailed description, taken in conjunction with the accompanying figures, in which.

DETAILED DESCRIPTION

Figure 1:
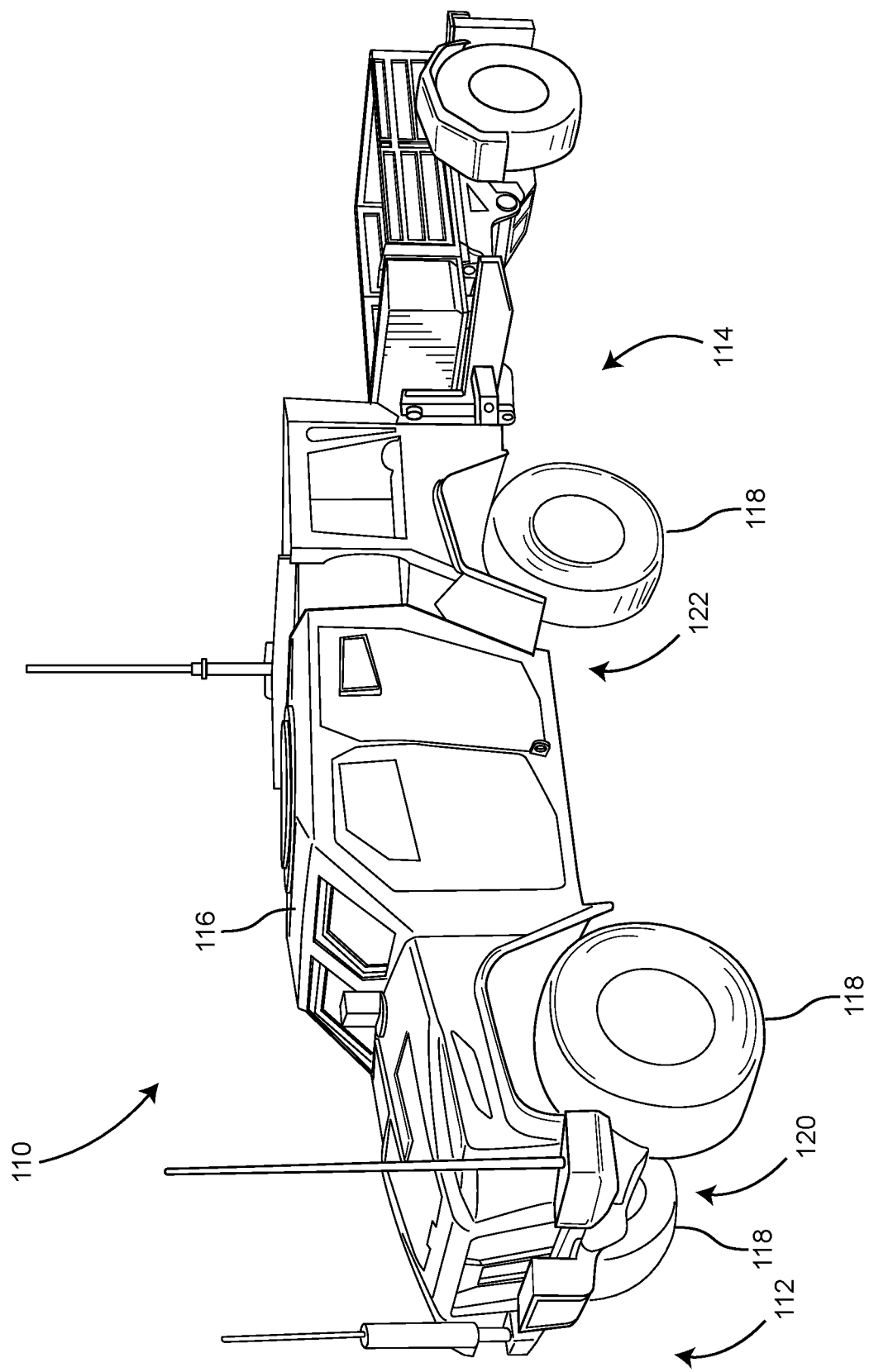
FIG. 1 is a perspective view of a truck assembly, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, systems and methods for improving stability and handling of a vehicle during turns and acceleration/deceleration are disclosed. According to an exemplary embodiment, the vehicle may include a body supported by a suspension system including one or more dampers positioned at opposite ends of an axle. In some embodiments, the dampers are configured to tend or be biased to extend or compress in response to a pitch or roll of the vehicle. Likewise, the roll and pitch of the vehicle may be controlled by controlling the extension and/or compression of the dampers. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough or off-road terrain. As such, the suspension system may be correspondingly configured to support the weight of the vehicle while providing comfortable ride quality on both paved and rough, off-road terrain. In some embodiments, the suspension system is configured to lower the center of gravity of the vehicle during turning or acceleration/deceleration (e.g., accelerating and braking) to improve roll and pitch stability of the vehicle.

When the vehicle undergoes a turn the damper positioned at an outside end of the axle relative to the turn may tend to compress, while the damper positioned at an inside end of the axle relative to the turn may tend to extend. In some embodiments, the extension of the damper positioned at the inside end of the axle relative to the turn may be controlled by one or more pressure compensated flow valves. In some embodiments, the extension of the damper positioned at the inside end of the axle relative to the turn may be controlled by one or more proportional variable relief valves. In some embodiments, the compression of the damper positioned at the outside end of the axle relative to the turn may be controlled by one or more pressure compensated flow valves. In some embodiments, the compression of the damper positioned at the outside end of the axle relative to the turn may be controlled by one or more proportional variable relief valves.

When the vehicle undergoes an acceleration event, one or more front dampers may tend to extend, and one or more rear dampers may tend to compress, according to some embodiments. The extension and compression of the front and rear dampers, respectively, may be controlled similarly to the extension and compression of the inside and outside dampers during a turn (e.g., with pressure compensated flow valves, with proportional variable relief valves, etc.). Controlling the extension and/or compression of the dampers effectively allows control over a pitch, a roll, a pitch rate, and/or a roll rate of the vehicle, according to some embodiments. Advantageously, controlling any of the pitch, roll, pitch rate, and/or roll rate of the vehicle results in improved stability and handling of the vehicle (e.g., during turns and acceleration/deceleration) and an ability to selectively adjust a position of a center of gravity of the vehicle. Additionally, the systems and methods described herein allows a center of rotation of the vehicle and an overall roll angle of the vehicle to be tuned. Advantageously, the systems and methods described herein are semi-active, and do not require a significant external power source to control the system (e.g., hydraulic pumps).

In some embodiments, vehicle dynamics are relayed from an inertial measurement unit (IMU) to a controller. In some embodiments, the controller is configured to determine an operation of the pressure compensated flow valves and/or the proportional variable relief valves based on the vehicle dynamics received from the IMU. In some embodiments, the controller is configured to determine an operation of the pressure compensated flow valves and/or the proportional variable relief valves based on a mode determined by a user interface. For example, the controller may be configured to selectively operate according to several modes (e.g., an off-road mode, a highway mode, a terrain-specific mode, etc.), as indicated by the user interface. In some embodiments, the modes determined different modes of operation of the controller which result in different operation of the pressure compensated flow valves and/or the proportional variable relief valves. In some embodiments, the controller is configured to control the proportional variable relief valves and/or the pressure compensated flow valve to adjust a damping rate of one or more of the dampers.

Referring to FIG. 1, a vehicle, shown as vehicle 110 is depicted, according to an exemplary embodiment. Vehicle 110 may be a military vehicle, a utility vehicle, or a sport utility vehicle according to some embodiments. In some embodiments, vehicle 110 is configured to operate on both paved roads as well as off-road rough terrain. Vehicle 110 is shown to have a front end 112 and a rear end 114 according to some embodiments. Vehicle 110 is also shown to include a body, shown as body 116, a front axle assembly, shown as front axle assembly 120, and a rear axle assembly, shown as rear axle assembly 122. Front axle assembly 120 and rear axle assembly 122 may be rotatably coupled to tractive elements, shown as wheels 118, such that front axle assembly 120 and rear axle assembly 122 may transmit power to wheels 118, according to some embodiments. Front axle assembly 120 and rear axle assembly 122 may be configured to support the weight of both the body 116 of vehicle 110 as well as the frame of vehicle 110. In some embodiments, each of front axle assembly 120 and rear axle assembly 122 may include a suspension system. The suspension system may be configured to absorb impacts from the terrain or road which the vehicle 110 travels on. In some embodiments, the suspension system may be configured to absorb depressions (e.g., potholes, gulleys, etc.), as well as bumps (e.g., objects in the road, curbs, uneven terrain, etc.). The suspension system may include dampers to absorb the depressions and bumps of the terrain. In some embodiments, the dampers may be hydraulic dampers and may be fluidly connected to each other.

Figure 2:
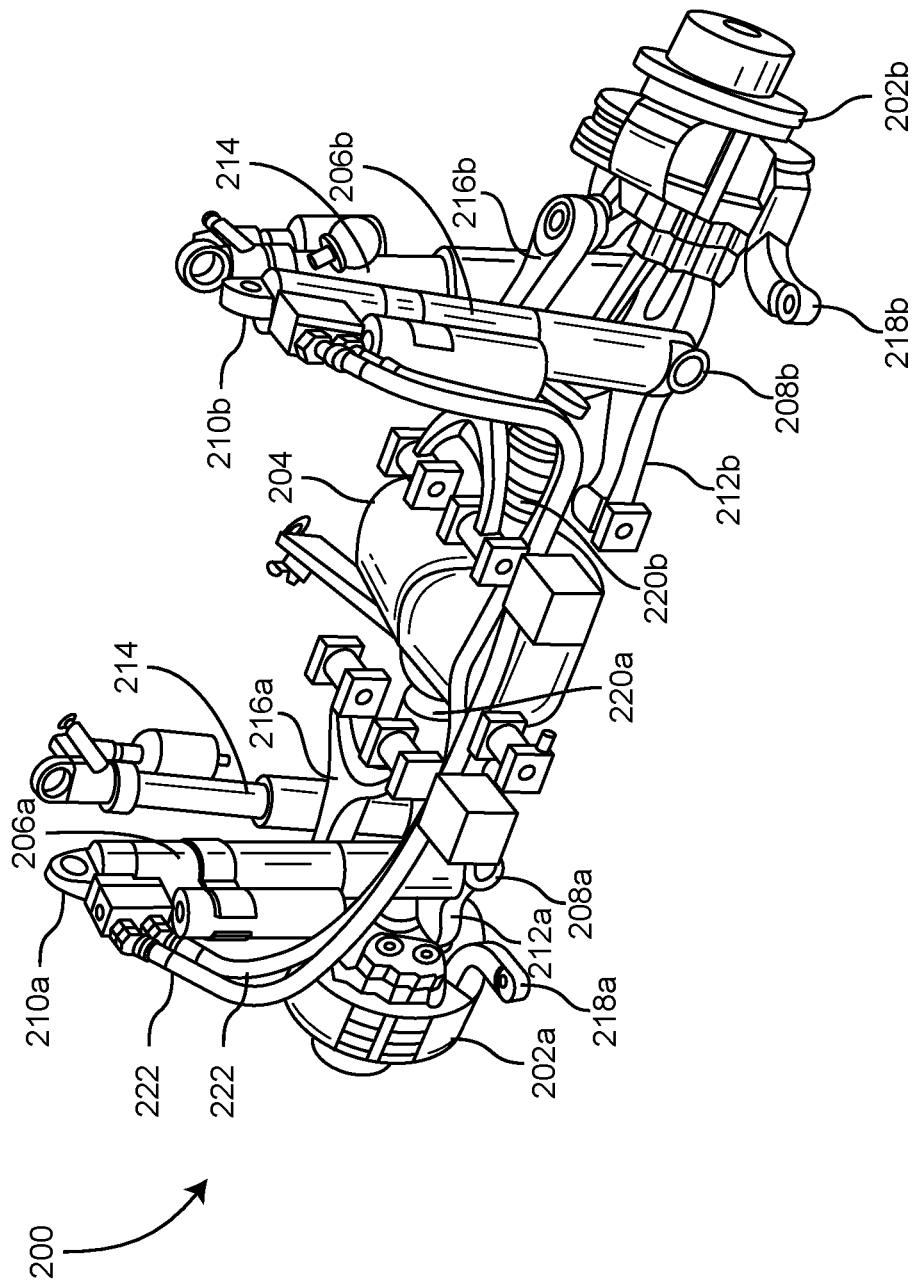
FIG. 2 is a perspective view of an axle assembly, according to an exemplary embodiment.

Referring now to FIG. 2, an axle assembly 200 is shown, according to an exemplary embodiment. Axle assembly 200 may be either of front axle assembly 120 or rear axle assembly 122. In some embodiments, front axle assembly 120 and rear axle assembly 122 are constructed similarly to axle assembly 200. In some embodiments, axle assembly 200 may include hub assembly 202a and hub assembly 202b, each configured to rotatably connect to a tractive element (e.g. one of wheels 118 of FIG. 1). Axle assembly 200 may include differential 204, according to some embodiments. In some embodiments, differential 204 may be rotatably coupled to a connecting shaft and may be configured to transfer rotational energy from the connecting shaft to axle 220a and axle 220b. Axle 220a and axle 220b may be rotatably coupled to hub assembly 202a and hub assembly 202b, and may be configured to drive the wheels of hub assembly 202a and hub assembly 202b according to some embodiments. Differential 204 may be a limited slip differential, an open differential, a locking differential, a spool, or any other differential which may be configured to transfer mechanical/rotational energy from the connecting shaft to hub assembly 202a and hub assembly 202b. In some embodiments, differential 204 is configured to transfer rotational energy from one axis (e.g., an axis extending through the connecting shaft) to one or more other axes (e.g., the axes extending through axle 220a and axle 220b). Axle 220a and axle 220b may be CV axles and may be configured to rotatably connect to differential 204 with a spline connection.

Hub assembly 202a and hub assembly 202b may each include brakes, according to some embodiments. In some embodiments, hub assembly 202a and hub assembly 202b include disk brakes, or drum brakes. In some embodiments, hub assembly 202a and hub assembly 202b may be pivotally connected to lower and upper control elements, shown as lower control arm 212a and lower control arm 212b, and upper control arm 216a and upper control arm 216b, respectively. Hub assembly 202a and hub assembly 202b may be configured to connect to lower control arm 212a and lower control arm 212b, and upper control arm 216a and upper control arm 216b, such that hub assembly 202a and hub assembly 202b may rotate to facilitate steering of the vehicle (e.g., a user may indicate a direction of turn with a steering wheel which causes hub assembly 202a and hub assembly 202b to rotate to cooperatively cause the vehicle to steer), while still being configured to support the weight of the vehicle. Hub assembly 202a and hub assembly 202b may include steering connectors, shown as steering knuckle 218a and steering knuckle 218b, respectively. In some embodiments, hub assembly 202a and steering knuckle 218a are integrally formed, and lower control arm 212b and steering knuckle 218b are also integrally formed. Steering knuckle 218a and steering knuckle 218b may be configured to be driven by tubular members (e.g., tie rods) to pivot hub assembly 202a and hub assembly 202b to steer the vehicle.

Referring still to FIG. 2, axle assembly 200 is shown to include dampers, shown as damper 206a and damper 206b, according to some embodiments. Damper 206a and damper 206b may each be hydraulic dampers and may each include a piston. In some embodiments, the piston may divide each of damper 206a and damper 206b into a first chamber and a second chamber. Damper 206a and damper 206b may be fluidly connected to each other through fluid lines 222, according to some embodiments. In some embodiments, damper 206a and damper 206b are cross-connected, such that the first chamber of damper 206a is fluidly connected to the second chamber of damper 206b, and the second chamber of damper 206a is fluidly connected to the first chamber of damper 206b. Damper 206a and damper 206b may each include a top connecting portion 210 and a bottom connecting portion 208. In some embodiments, the top connecting portion 210 of damper 206a and damper 206b may connect to the body of the vehicle. In some embodiments, the bottom connecting portion 208 of damper 206a and damper 206b may connect to control arm 212a and control arm 212b, respectively.

Figure 3:
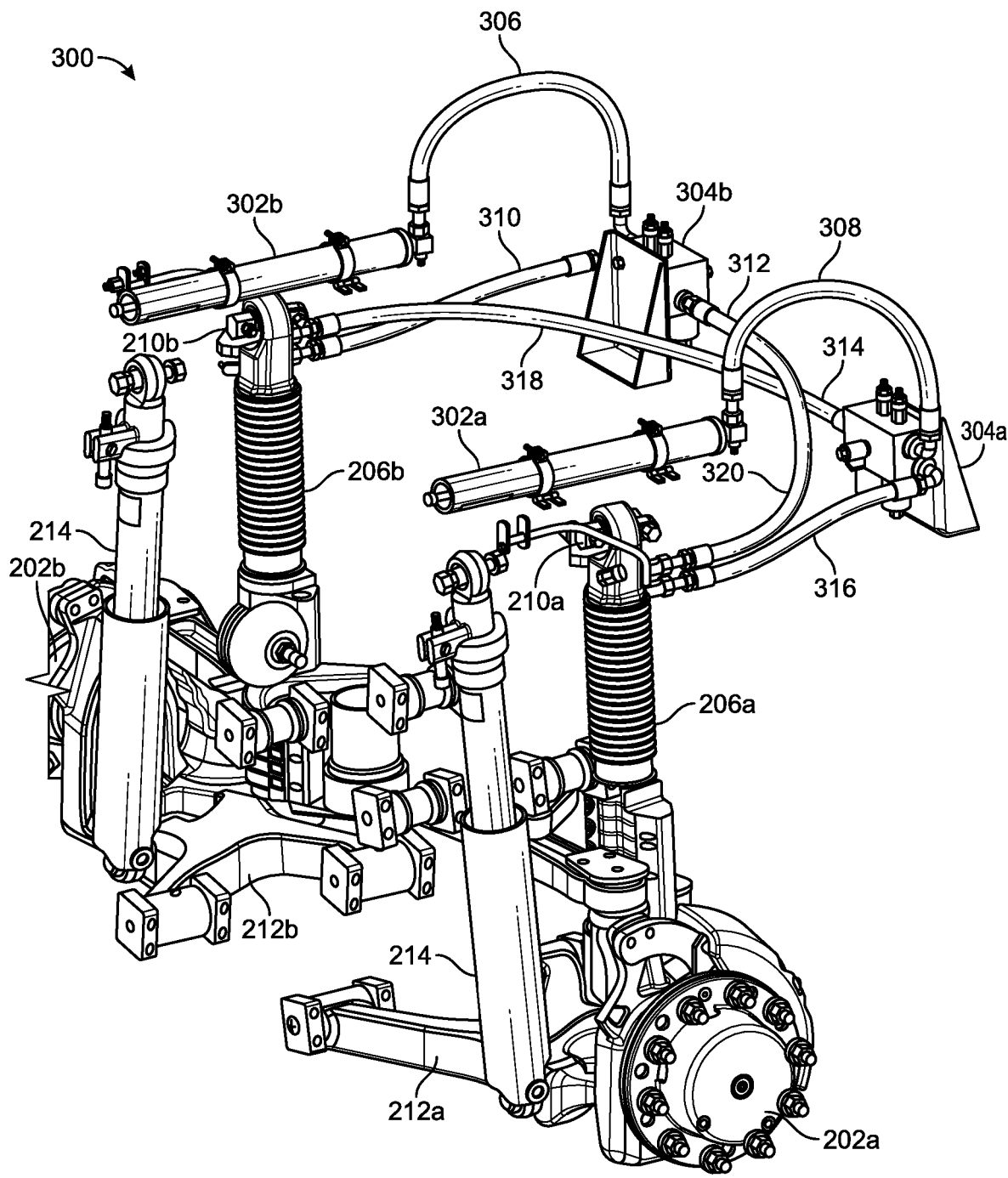
FIG. 3 is a perspective view of a damper suspension assembly, according to an exemplary embodiment.

Referring now to FIG. 3, a suspension system 300 for a vehicle is shown, according to an exemplary embodiment. In some embodiments, suspension system 300 is the same as or similar to axle assembly 200. In some embodiments, suspension system 300 is the same as or similar to front axle assembly 120 or rear axle assembly 122 and may be used as front axle assembly 120 or rear axle assembly 122 with vehicle 110. Suspension system 300 is shown to include control arm 212a, control arm 212b, damper 206a, damper 206b, hub 202a, and hub 202b according to some embodiments. In some embodiments, damper 206a and damper 206b are configured to connect to the body of the vehicle through connecting portion 210a and connecting portion 210b, respectively. Connecting portion 210a and connecting portion 210b may be configured to removably connect to the body of the vehicle (e.g., via a fastener such as a bolt, a rivet, etc.) according to some embodiments. In some embodiments, suspension system 300 may also include shocks 214, which may be configured to absorb some of the impacts transferred through the suspension system.

Referring still to FIG. 3, damper 206a and damper 206b are shown fluidly connected to each other. Each of damper 206a and damper 206b may include a piston, substantially aligned with and internal to a housing of damper 206a and damper 206b. The piston may divide each of damper 206a and damper 206b into a first chamber and a second chamber. The first chamber may be defined between a surface of the piston, an internal surface of the housing, and a first end of the damper 206. The second chamber may be defined between an opposite surface of the piston, an internal surface of the housing, and a second end of the damper 206. In some embodiments, the first end and the second end of damper 206 are opposite ends of damper 206. In some embodiments, damper 206a and damper 206b are similarly constructed but are mirrored relative to each other. In some embodiments, damper 206a and damper 206b are cross-plumbed. For example, the first chamber of damper 206a may be fluidly connected to the second chamber of damper 206b, while the second chamber of damper 206a may be fluidly connected to the first chamber of damper 206b. In some embodiments, when the damper 206 extends, the first chamber fills with hydraulic fluid, while the second chamber expels hydraulic fluid. In some embodiments, when the damper 206 compresses, the first chamber expels hydraulic fluid while the second chamber fills with hydraulic fluid. Alternatively, in another embodiment, when the damper 206 extends, the first chamber expels hydraulic fluid and the second chamber fills with hydraulic fluid. When the damper 206 compresses, the first chamber may fill with hydraulic fluid and the second chamber may expel hydraulic fluid.

Still referring to FIG. 3, the suspension system 300 is shown to include valves and accumulators, shown as valve 304a, valve 304b, accumulator 302a, and accumulator 302b. Valve 304a may be fluidly connected to the first or second chamber of damper 206a through hydraulic line 316. Valve 304b may be connected to the second or first chamber of damper 206a through hydraulic line 312. If the first chamber of damper 206a is connected to valve 304a with hydraulic line 316, then second chamber of damper 206a is connected to valve 304b with hydraulic line 312. If second chamber of damper 206a is connected to valve 304a with hydraulic line 316, then the first chamber of damper 206a is connected to valve 304b with hydraulic line 312. Damper 206b is also shown fluidly connected to valve 304a and valve 304b. Damper 206b may be fluidly connected to valve 304a through hydraulic line 314 and may be fluidly connected to valve 304b through hydraulic line 310. Damper 206b may be fluidly connected to valve 304a and valve 304b, such that the first chamber of damper 206b is fluidly connected to the second chamber of damper 206a, and the second chamber of damper 206b is fluidly connected to the first chamber of damper 206a. For example, the first chamber of damper 206a may be fluidly connected to valve 304b through hydraulic line 312, and valve 304b may be fluidly connected to the second chamber of damper 206b through hydraulic line 310, resulting in fluid flow path 320 from the first chamber of damper 206a to the second chamber of damper 206b. The fluid flow path 320 may be produced by hydraulic line 312, valve 304b, and hydraulic line 310. In some embodiments, fluid flow path 320 fluidly connects the first chamber of damper 206a with second chamber of damper 206b. Alternatively, fluid flow path 320 may fluidly connect second chamber of damper 206a with the first chamber of damper 206b.

Fluid flow path 318 may connect first and second chambers of damper 206a and damper 206b, respectively, or may connect the second and first chambers of damper 206a and damper 206b, respectively. Fluid flow path 318 may be formed by hydraulic line 314, valve 304a, and hydraulic line 316. In some embodiments, fluid flow path 318 fluidly connects the first chamber of damper 206b with second chamber of damper 206a. In some embodiments, fluid flow path 318 fluidly connects second chamber of damper 206b with the first chamber of damper 206a.

Hydraulic line 306, hydraulic line 308, hydraulic line 316, and hydraulic line 314 may be tubular members, configured to allow the flow of hydraulic fluid. In some embodiments, hydraulic line 306, hydraulic line 308, hydraulic line 316, and hydraulic line 314 are flexible tubular members, and may be made of rubber, rubber reinforced with a wire mesh, plastic, a polymer, etc. In some embodiments, hydraulic line 306, hydraulic line 308, hydraulic line 316, and hydraulic line 314 are made of rigid steel members, having a hollow section which allows the fluid of fluid therein. Hydraulic line 306, hydraulic line 308, hydraulic line 316, and hydraulic line 314 may be generally circular and may be any diameter which provides suitable flow characteristics.

Figure 4A:
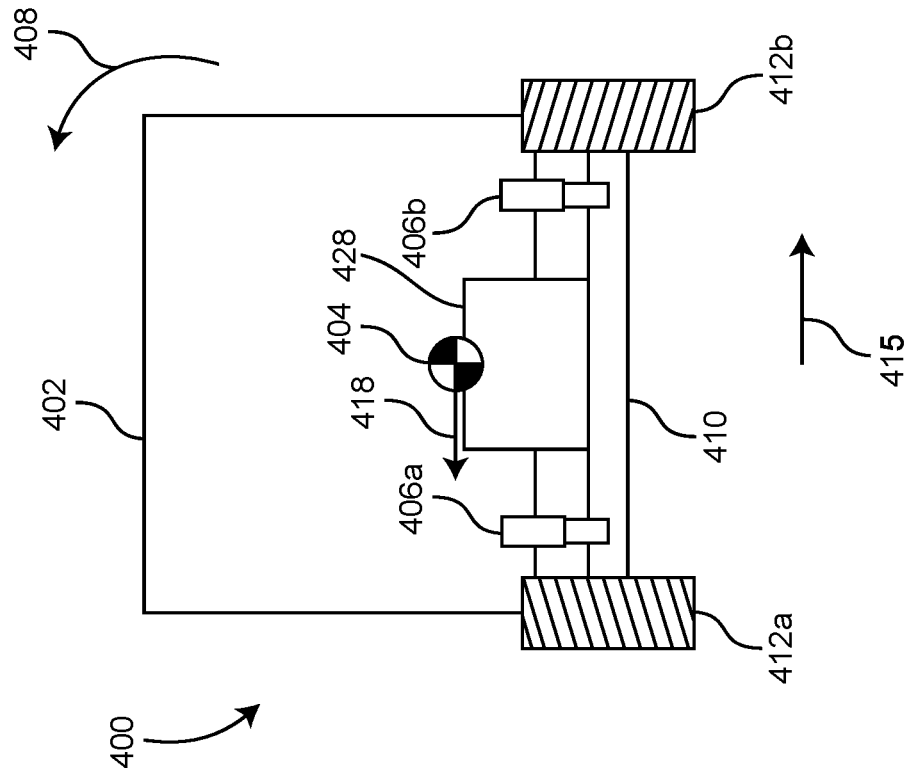
FIG. 4A is a front view of a vehicle during a left hand turn, according to an exemplary embodiment.
Figure 4B:
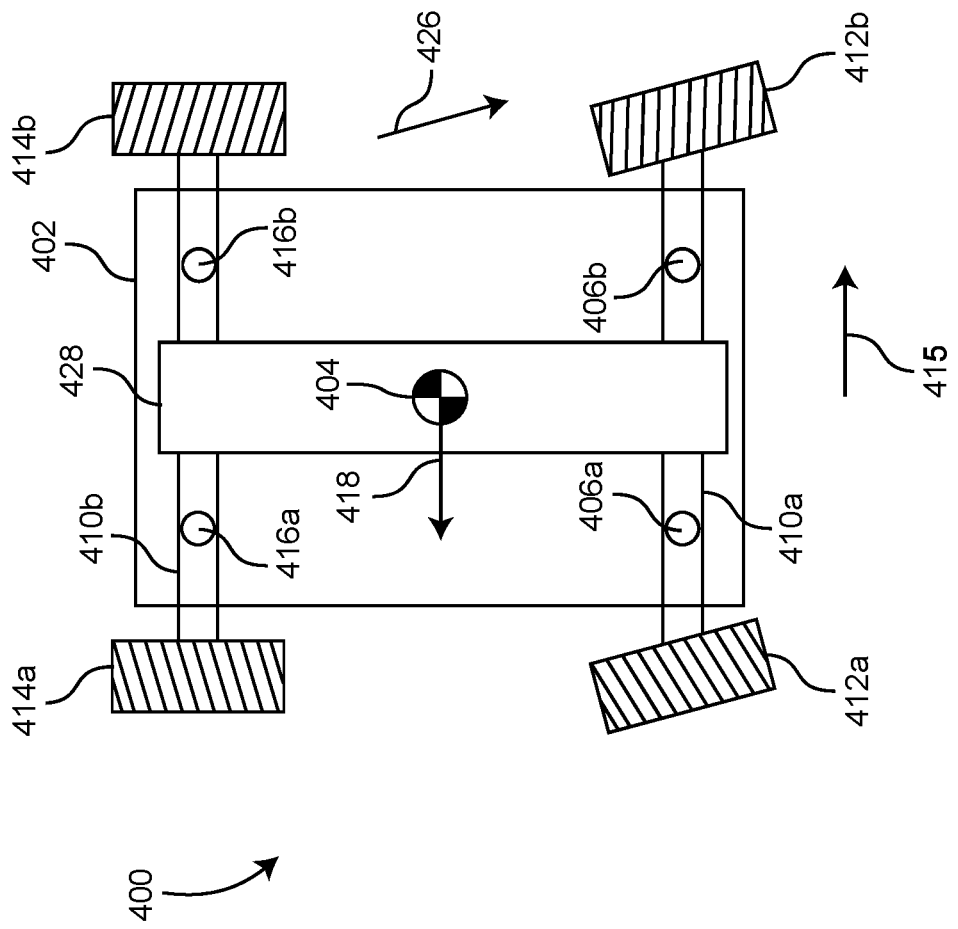
FIG. 4B is a top view of the vehicle during the left hand turn of FIG. 4A, according to an exemplary embodiment.
Figure 5A:
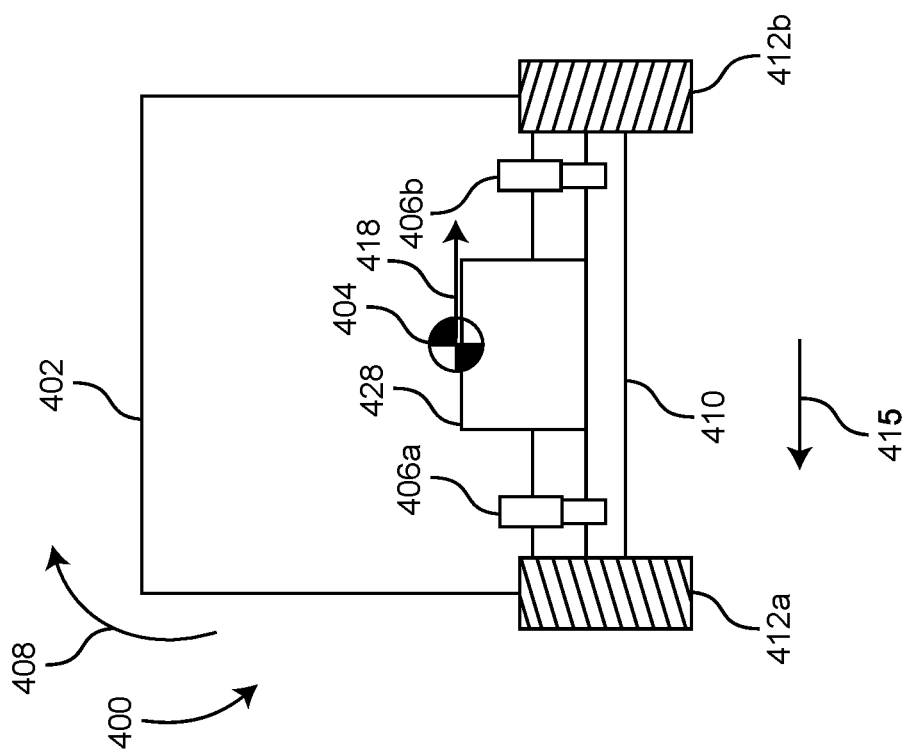
FIG. 5A is a front view of a vehicle during a right hand turn, according to an exemplary embodiment.
Figure 5B:
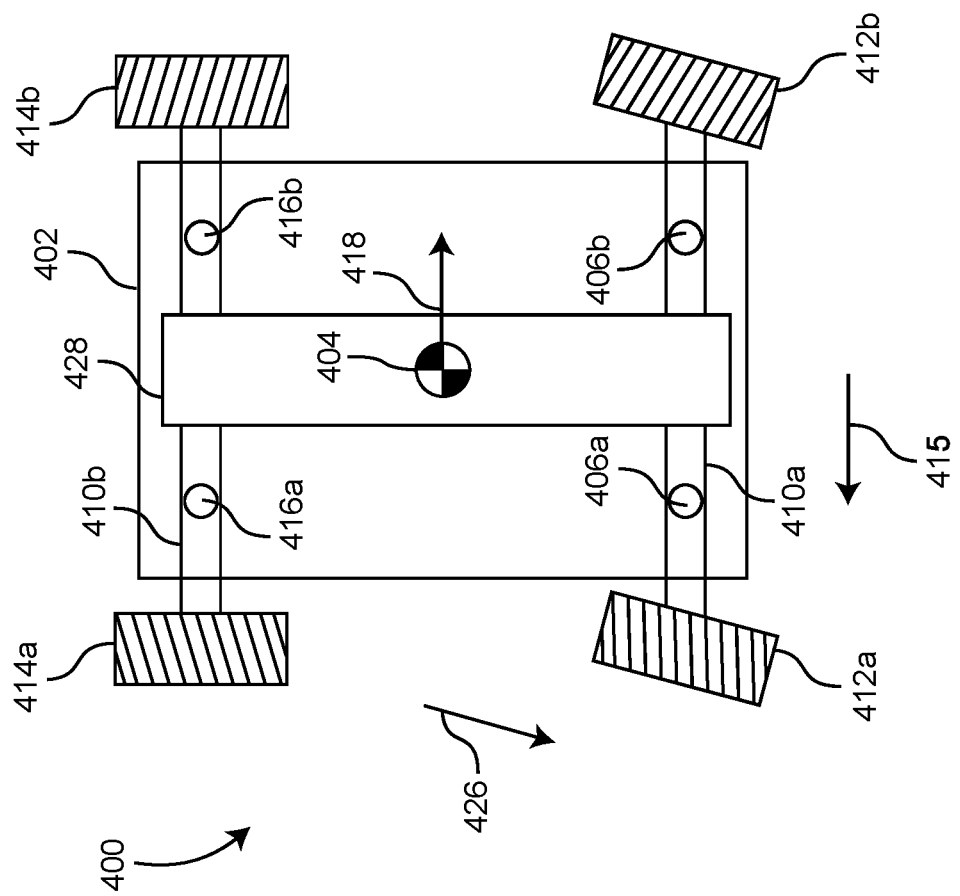
FIG. 5B is a top view of the vehicle during the right hand turn of FIG. 5A, according to an exemplary embodiment.
Figure 6A:
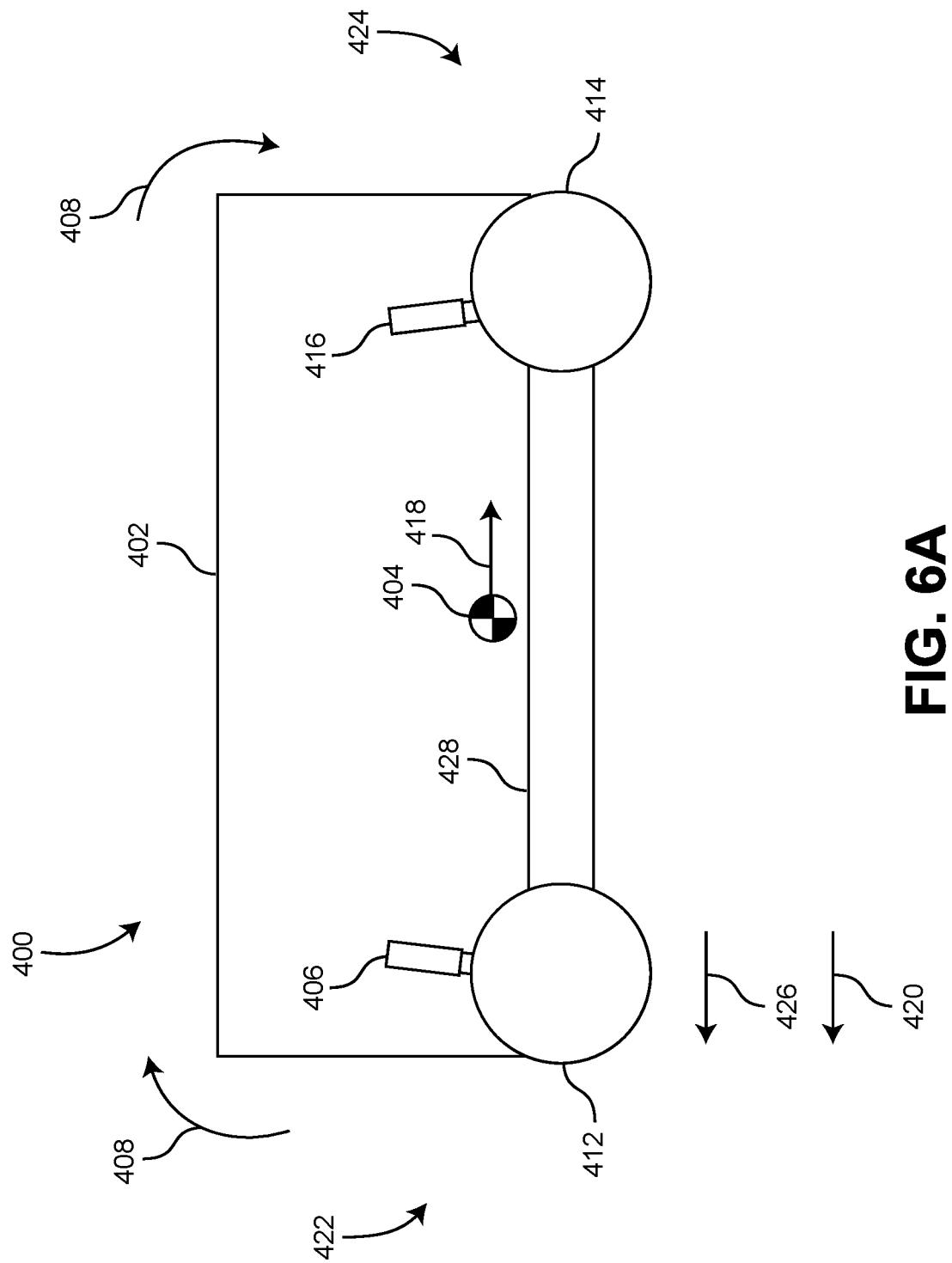
FIG. 6A is a side view of a vehicle during acceleration, according to an exemplary embodiment.
Figure 6B:
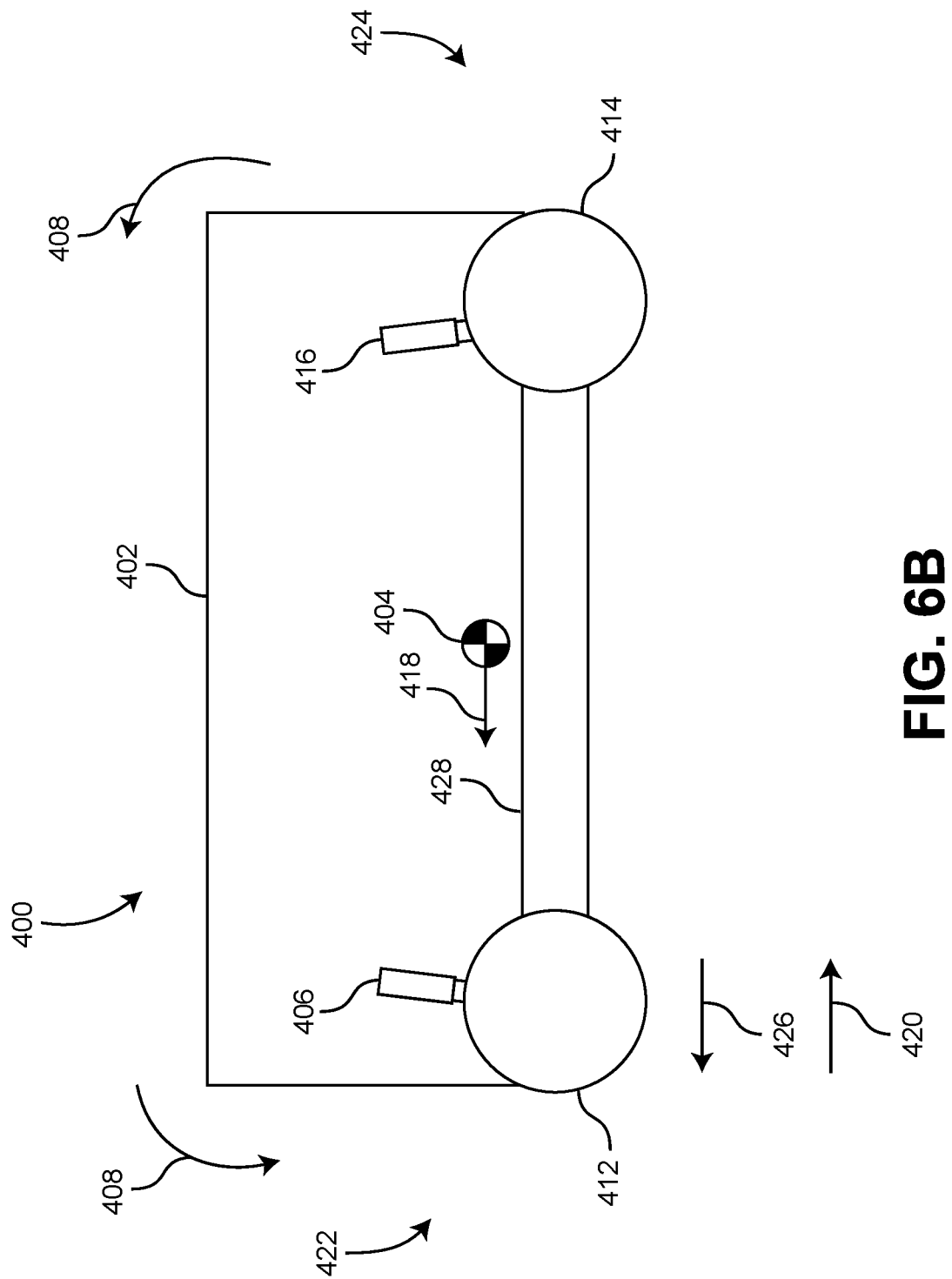
FIG. 6B is a side view of a vehicle during deceleration, according to an exemplary embodiment.

The suspension system 300 may be configured to operate to lower the center of gravity of the vehicle (or the body of the vehicle) during turns as well as during acceleration and deceleration. The operation of suspension system 300 when the vehicle takes a left hand turn is shown in FIGS. 4A-4B. The operation of suspension system 300 when the vehicle takes a right hand turn is shown in FIGS. 5A-5B. The operation of suspension system 300 during acceleration and deceleration is shown in FIGS. 6A-6B.

Referring now to FIGS. 4A-4B, a diagram of a vehicle system 400 is shown while undergoing a left hand turn, according to an exemplary embodiment. FIG. 4A depicts a front view of the vehicle system 400. FIG. 4B depicts a top view of the vehicle system 400. Vehicle system 400 is shown to include a body 402, a frame 428, an axle 410, a right wheel 412a, a left wheel 412b, a right damper 406a, and a left damper 406b, according to an exemplary embodiment. Vehicle system 400 is shown to have center of gravity 404. In some embodiments, center of gravity 404 is the center of gravity of body 402. As the vehicle system 400 moves in direction of travel 426 (towards the viewer in FIG. 4A), and makes a left hand turn, indicated by direction of turn 415, vehicle system 400 may tend to roll due to inertia of the vehicle system 400. During a left hand turn, vehicle system 400 may roll in direction 408. In some embodiments, direction 408 indicates the roll direction of the body 402 of the vehicle system 400. As vehicle system 400 makes a turn, a turning radius of a turn circle is defined by the turn of vehicle system 400. The vehicle system 400 accelerates towards the center of the turn circle with acceleration $$a = \frac{v^2}{r},$$

where a is the acceleration of the vehicle system 400 towards the center of the turn circle, v is the velocity of the car travelling in direction of travel 426, and r is the radius of the turn circle. A force in direction 418, extending from the center of gravity 404 may result from the acceleration of the vehicle system 400 and the mass of the vehicle system 400. The force which extends outwards from the center of gravity 404 in direction 418 can be calculated by F=ma, where m is the mass of the vehicle system 400 (or the mass of the body 402), and a is the acceleration of the vehicle system 400 towards the center of the turn circle.

The force extending outwards from the center of gravity 404 in direction 418 may produce a moment in direction 408. This may cause the body 402 of the vehicle system 400 to roll. In some cases, the vehicle system 400 may rollover if the moment in direction 408 exceeds a threshold value. If the vehicle system 400 rolls over while undergoing a left hand turn, the point which the vehicle system 400 may tip about is the contact point between wheel 412a (the outside wheel in a left hand turn) and the ground. The force extending from the center of gravity 404 in direction 418 due to the turn of the vehicle system 400 may produce a moment about the contact point between wheel 412a and the ground. If the center of gravity of the vehicle system 400 is high relative to the ground, this may result in a longer moment arm, which may increase the tipping or rolling moment (i.e., the moment in direction 408). Therefore, decreasing the moment arm by maintaining the center of gravity 404 closer to the ground (e.g., the road) decreases the tendency of the vehicle system 400 to tip or roll while undergoing turns.

As the vehicle system 400 makes a left hand turn and begins to tip or roll, damper 406b (the inside damper during a left hand turn) may extend (e.g., increase in length), and damper 406a (the outside damper during a left hand turn) may compress (e.g., decrease in length). As damper 406b extends and damper 406a compresses, the vehicle system 400 may become more susceptible to tipping or rolling, particularly if the center of gravity 404 shifts higher relative to the ground, producing a larger moment arm. Damper 406a and damper 406b may be configured to resist rollover or tipping by having controlled extension/compression. For example, when the vehicle system 400 makes a left hand turn, damper 406b (the inner damper in a left hand turn) may tend to extend, elevating the center of gravity 404 relative to the ground. The extension of damper 406b past a certain threshold value may indicate excessive tipping or rollover, and the extension of damper 406b may further make the vehicle system 400 more susceptible to rolling over completely. Damper 406b may be configured to be prevented from extending when vehicle system 400 undergoes a turn. In some embodiments, damper 406b is completely prevented from extending (i.e., damper 406b becomes locked at least in the extension direction). In some embodiments, the extension of damper 406b is damped or otherwise controlled such that it is only allowed to extend a certain amount before it locks out or is allowed to extend at a damped rate. For example, damper 406b may be allowed to extend 1 cm before being locked from extending. In some embodiments, damper 406b may encounter more resistance to extension as it extends. The resistance of damper 406b to extend may be a linear relationship depending on the extension amount of damper 406b. In some embodiments, the relationship between the resistance of damper 406b to extending, and the extension of damper 406b may be non-linear (e.g., parabolic, exponential, etc.). In some embodiments, the resistance of damper 406b to extend is achieved by controlling the stiffness of damper 406b, and/or the damping of damper 406b. The stiffness and/or damping of damper 406b may be adaptably determined and adjusted based on the characteristics of the turn (e.g., the speed, angle of turn, acceleration of vehicle, yaw rate, lateral acceleration, steering wheel angle, etc.) and characteristics of the vehicle system 400 (e.g., weight, center of gravity, etc.), according to some embodiments.

While damper 406b (the inside damper during a left-hand turn) may be configured to be prevented or limited from extending, damper 406a may be allowed to compress, according to some embodiments. Moment 408 may result in compressive forces on damper 406a which may cause damper 406a to compress. Allowing damper 406a to compress while preventing or limiting damper 406b from extending may result in the center of gravity 404 lowering closer to the ground and may result in a more roll-resistant vehicle system 400. In some embodiments, damper 406a is allowed to compress freely, without the resistance of damper 406a to compression being adjusted. In some embodiments, the compression of damper 406a is controlled similar to the control of damper 406b to extension. For example, the stiffness and/or damping of damper 406a may be adjusted and/or determined based on characteristics of the turn (e.g., the speed, angle of turn, acceleration of vehicle, yaw rate, lateral acceleration, steering wheel angle, etc.), or by the operation of damper 406b. Damper 406a and damper 406b may be configured to cooperatively operate to lower the center of gravity 404 to resist rollover, and/or to maintain a comfortable ride and to provide ride stability to vehicle system 400.

The extension of damper 406b may be controlled by controlling the outflow and/or inflow of hydraulic fluid to/from damper 406b. For example, a valve may be configured to restrict or allow flow of hydraulic fluid into and/or out of damper 406b. In some embodiments, damper 406b may be controlled by pressure compensated flow valves, which may include an electronically actuatable needle, configured to adjust the volumetric flow rate of fluid flowing through the pressure compensated flow valve. When the electronically actuatable needle is actuated to a certain position, the volumetric flow rate through the pressure compensated flow valve may remain relatively constant, regardless of any pressure differential across the pressure compensated flow valve. In some embodiments, both damper 406a and damper 406b are controlled by pressure compensated flow valves. Any number of pressure compensated flow valves may be used, and pressure compensated flow valves may be electronically controlled to cooperatively facilitate desired extension and compression of damper 406a and damper 406b, depending on the vehicle dynamics.

In some embodiments, the extension of damper 406b may be controlled by pressure compensated flow valve, such that a certain amount of flow rate is allowed into and/or out of damper 406b to control the extension. In some embodiments, no fluid is allowed to enter and/or exit damper 406b through pressure compensated flow valve. In some embodiments, while the extension of damper 406b is controlled, the compression of damper 406a is also controlled by controlling the flow rate of fluid entering and/or exiting damper 406a through pressure compensated flow valves. This may allow the vehicle system 400 to reach a steady state condition faster.

In some embodiments, each of the first chamber and second chamber of damper 406a and damper 406b has a corresponding pressure compensated flow valve. For example, damper 406a may have a first pressure compensated flow valve which controls the flow rate of fluid entering/exiting the first chamber of damper 406a, and a second pressure compensated flow valve which controls the flow rate of fluid entering/exiting the second chamber of damper 406a. Likewise, damper 406b may have a first pressure compensated flow valve which controls the flow rate of fluid entering/exiting the first chamber of damper 406b, and a second pressure compensated flow valve which controls the flow rate of fluid entering/exiting the second chamber of damper 406b. In some embodiments, each of damper 406a and damper 406b has only one corresponding pressure compensated flow valve, each configured to control the extension/compression of damper 406a and damper 406b. For example, the extension and/or compression of damper 406a may be controlled by a single pressure compensated flow regulator, configured to control the flow rate of fluid entering or exiting either the first chamber of damper 406a or the second chamber of damper 406a. Likewise, the extension and/or compression of damper 406b may be controlled by a single pressure compensated flow regulator configured to control the flow rate of fluid entering or exiting either the first chamber of damper 406b or the second chamber of damper 406b.

In some embodiments, valves which control the extension and/or compression of damper 406a and damper 406b may be positioned in line with a hydraulic line which fluidly connects damper 406a and damper 406b (e.g., valve 304a and valve 304b as shown in FIG. 3). In some embodiments, valves which control the extension and/or compression of damper 406a and damper 406b may be integrated with damper 406a and damper 406b. For example, the valves may be removably connected near inlet/outlet ports of damper 406a and damper 406b. In some embodiments, the valves may be integrally formed with damper 406a and damper 406b.

In some embodiments, valves may be positioned in valve blocks. Valve blocks may be integrated into the structure of damper 406a and damper 406b, or may be positioned in-line, as shown in FIG. 3. According to some embodiments, valves may include relief valves. For example, if pressure compensated valves are used, relief valves may also be included and may be integrally formed with pressure compensated valves. Relief valves may act to maintain a relatively stable pressure.

Referring to FIG. 4B, a top view of the vehicle system 400 of FIG. 4A while performing a left hand turn is depicted. Vehicle system 400 is shown to have front axle 410a, rear axle 410b, front wheels 412, rear wheels 414, front dampers 406, rear dampers 416, frame 428, and body 402. Front dampers 406 may operate as described above with reference to FIG. 4A. Rear dampers 416 may operate similar to front dampers 406. In some embodiments, rear dampers 416 operate similarly to front dampers 406 but may have different characteristics. For example, rear dampers 416 may be generally stiffer, or generally have more damping than front dampers 406. In some embodiments, rear dampers 416 may be configured to have characteristics to cooperatively resist rollover of vehicle system 400 with front dampers 406. In some embodiments, for example, center of gravity 404 may be closer to front dampers 406, and the front end of vehicle system 400 may be more susceptible to rollover. In some embodiments, center of gravity 404 may be closer to rear dampers 416 and the rear end of vehicle system 400 may be more susceptible to rollover. The operational characteristics of front dampers 406 and rear dampers 416 may depend on the position of center of gravity 404 according to some embodiments. In some embodiments, the operational characteristics of front dampers 406 and rear dampers 416 may depend on the terrain which the vehicle system 400 travels upon. For example, of vehicle system 400 is making a left hand turn and the elevation of the ground is decreasing as vehicle system 400 travels in direction 426, damper 416*b* may have higher stiffness and/or damping to prevent damper 416*b* from extending. Another example is if the terrain the vehicle system 400 travels upon is uneven, or is pitched. If the vehicle system 400 is undergoing a pitched turn, operational characteristics of the front dampers 406 and/or the rear dampers 416 may be adjusted in order to prevent rollover and maintain ride stability.

Advantageously, controlling the extension and/or compression of dampers 406 and/or dampers 416 provides better ride stability for vehicle system 400. Controlling or adjusting the operational characteristics of dampers 406 and/or dampers 416 may provide a better resistance to tipping or rollover. Tipping or rollover may introduce uneven excessive loads into the vehicle system 400 which may damage suspension components. In some cases, providing a better rollover stability may allow the vehicle system 400 operator to make turns at higher speeds without concern of rollover. Tipping or rollover may also decrease the stability of the vehicle system 400. This may result in vehicle system 400 being difficult to steer. A complete rollover may damage components in vehicle system 400, which may require repair. The systems and methods described herein facilitate better ride stability and resistance to rollover, decreasing the likelihood of vehicle system 400 component damage, and decreasing the likelihood of rollover.

Referring now to FIGS. 5A-5B, a diagram of vehicle system 400 is shown while undergoing a right hand turn, according to an exemplary embodiment. FIG. 5A depicts a front view of the vehicle system 400. FIG. 5B depicts a top view of the vehicle system 400. The description of FIGS. 5A-5B is similar to the above description with reference to FIGS. 4A-4B, however, damper 406*a* is now undergoing extension, and damper 406*b* is now undergoing compression. The vehicle system 400 of FIGS. 5A-5B may operate and function as the vehicle system 400 of FIGS. 5A-5B, however, whatever is said of damper 406*b* is now said of damper 406*a*, whatever is said of damper 406*a* is now said of damper 406*b*, whatever is said of damper 416*b* is said of damper 416*a*, whatever is said of damper 416*a* is said of damper 416*b*, etc. The vehicle system 400 of FIGS. 5A-5B may be the same vehicle system of FIGS. 4A-4B, however the operation of vehicle system 400 with reference to FIGS. 4A-4B is now mirrored such that vehicle system 400 with reference to FIGS. 5A-5B achieves the same functions of resisting rollover, lowering the center of gravity 404, etc., while undergoing a right hand turn.

Referring now to FIGS. 6A-6B, the vehicle system 400 is shown undergoing acceleration and deceleration (i.e., braking) according to an exemplary embodiment. Vehicle system 400 is shown to have front end 422 and rear end 424. FIGS. 6A-6B show the vehicle system 400 including body 402, frame 428, front damper 406, rear damper 416, front wheel 412, and rear wheel 414. In some embodiments, front damper 406 represents a pair of front dampers, rear damper 416 represents a pair of rear dampers, front wheel 412 represents a pair of front wheels, and rear wheel 414 represents a pair of rear wheels. Direction 426 indicates direction of travel of vehicle system 400, and direction 420 indicates direction of acceleration of vehicle system 400. FIG. 6A depicts vehicle system 400 undergoing acceleration (i.e., the direction of travel of vehicle system 400 is the same as the direction of acceleration of vehicle system 400), and FIG. 6B depicts vehicle system 400 undergoing braking (i.e., the direction of travel of vehicle system 400 is in the opposite direction as the direction of acceleration of vehicle system 400).

Referring to FIG. 6A, the vehicle system 400 is shown accelerating. As vehicle system 400 accelerates in direction 420 and travels in direction 426, vehicle system 400 tends to rotate in direction 408 due to the inertial force extending from the center of gravity 404 of vehicle system 400 (or body 402) in direction 418. In some embodiments, body 402 rotates in direction 408, while frame 428 does not rotate in direction 408. The rotation of vehicle system 400 or body 402 causes the front end 422 of vehicle system 400 or body 402 to raise and the rear end 424 of vehicle system 400 or body 402 to lower, resulting in front damper 406 extending and rear damper 416 compressing. In some embodiments, each of front damper 406 and rear damper 416 represents a pair of dampers (e.g., a pair of front dampers and a pair of rear dampers).

If the front end 422 of vehicle system 400 raises above an upper threshold value, and the rear end of vehicle system 400 lowers below a lower threshold value, this may produce instability in the vehicle system 400. In order to prevent vehicle system 400 from becoming unstable, the extension of front damper 406 may be controlled similar to the description with reference to FIGS. 4A-4B and FIGS. 5A-5B. The extension of front damper 406 may be limited or it may be restricted completely according to some embodiments. For example, if fluid is not allowed to flow into or out of front damper 406, front damper 406 cannot extend, or the extension is substantially restricted. Front damper 406 and rear damper 416 may operate similarly to the operation of damper 406*b* and 406*a* of FIGS. 4A-4B, respectively. Rear damper 416 may be allowed to compress while front damper 406 is restricted from extending, according to some embodiments. This may result in the center of gravity 404 lowering relative to the ground, providing better resistance to pitching and providing better ride stability while vehicle system 400 is accelerating.

Referring now to FIG. 6B, the vehicle system 400 is shown braking. Vehicle system 400 travels in direction 426 and accelerates in direction 420. In FIG. 6B, the direction of travel 426 and direction of acceleration 420 oppose each other, and as such, the vehicle system 400 is depicted during braking. As vehicle system 400 brakes, an inertial force extending from center of gravity 404 in direction 418 causes the body 402 or vehicle system 400 to rotate in direction 408. The inertial force extending from center of gravity 404 in direction 418 produces a moment about the point of contact of front wheel 412 and the ground, as well as rear wheel 414 and the ground. This results in the body 402 or vehicle system 400 rotating in direction 408 (i.e., pitching forwards). As body 402 or vehicle system 400 rotates in direction 408, the front end 422 of vehicle system 400 or body 402 lowers, and the rear end 424 of vehicle system 400 or body 402 raises. This results in the front damper 406 compressing, and the rear damper 416 extending. When vehicle system 400 or body 402 rotates in direction 408 past a threshold value, components of vehicle system 400 can be exposed to excessively high loads which can cause damage to the components of vehicle system 400. Additionally, excessive rotation of vehicle system 400 or body 402 may produce uneven braking between the front wheels 412 and the rear wheels 414. This may decrease the stopping distance of the vehicle system 400 and may produce uneven wear of the front and rear brakes. In some embodiments, excessive rotation of body 402 or vehicle system 400 can result in unstable handling of vehicle system 400.

Referring still to FIG. 6B, front damper 406 and rear damper 416 may be configured to operate and function similarly to front damper 406 and rear damper 416 of FIG. 6A. However, instead of front damper 406 being configured to restrict extension of front damper 406, rear damper 416 may be configured to restrict extension of rear damper 416. Vehicle system 400 of FIG. 6B may be configured to operate similarly to vehicle system 400 of FIG. 6A, however, whatever is said of front damper 406 of FIG. 6A may be said of rear damper 416 of FIG. 6B, and whatever is said of rear damper 416 of FIG. 6A may be said of front damper 406 of FIG. 6B. In some embodiments, vehicle system 400 may brake faster than it can accelerate. For example, vehicle system 400 may accelerate at a maximum acceleration of 5 m/s$^2$, but may decelerate (i.e., brake) at a rate of 8 m/s$^2$, or faster. This may result in a larger inertial force extending from the center of gravity 404 in direction 418 while braking as compared to the inertial force when accelerating. In some embodiments, this may result in more tipping in direction 408 during braking as compared to the tipping in direction 408 during acceleration. Because of this, front damper 406 and rear damper 416 may use different operational characteristics when braking as compared to the operational characteristics used while accelerating. In some embodiments, the operational characteristics of front damper 406 and rear damper 416 are adaptably adjusted based on the acceleration or deceleration of vehicle system 400. For example, the damper which extends during braking (i.e., damper 416 as shown in FIG. 6B), may require greater stiffness or damping as compared to the damper which extends during acceleration (i.e., damper 406 as shown in FIG. 6A). Additionally, the damper which compresses during braking (i.e., damper 406) may have greater stiffness and/or damping than the damper which compresses during acceleration (i.e., damper 416).

Figure 7:
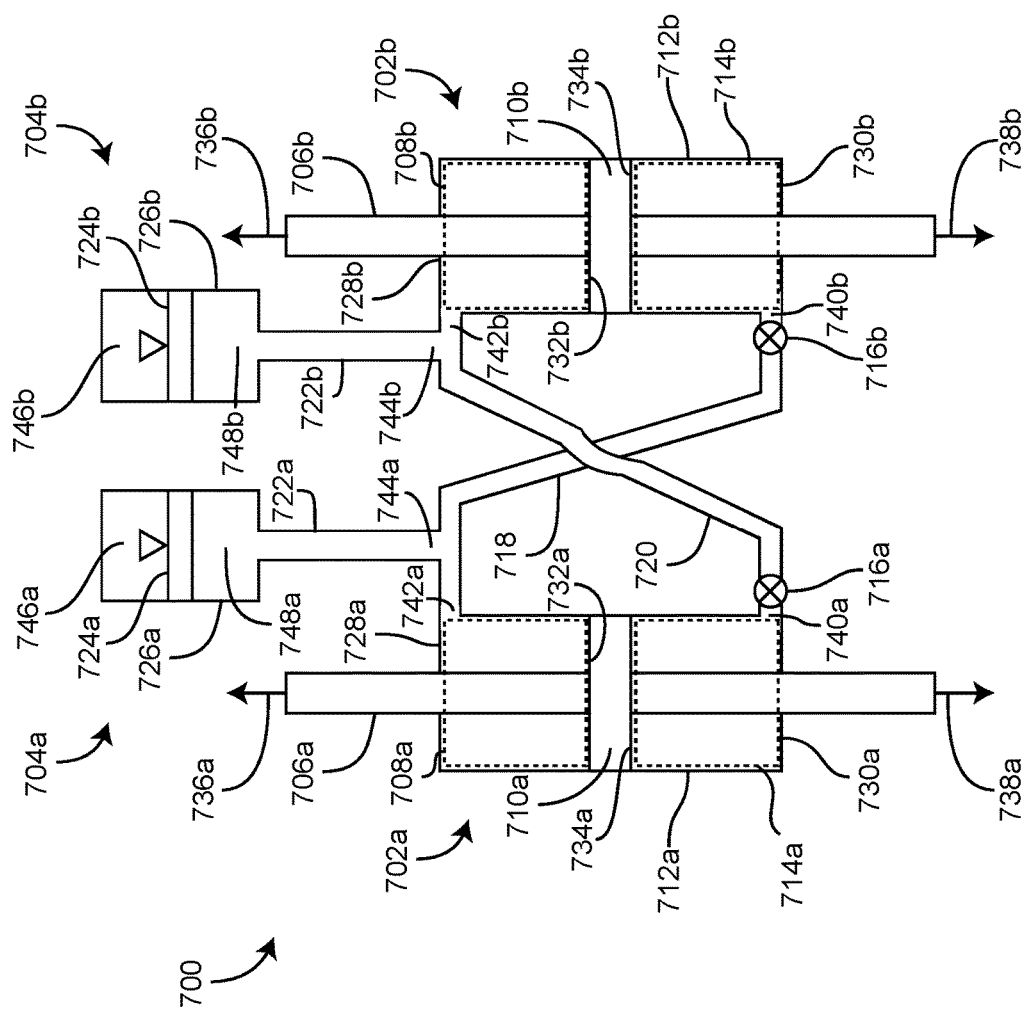
FIG. 7 is a damper system assembly, according to an exemplary embodiment.

Referring now to FIG. 7, a damper system 700 is shown according to an exemplary embodiment. In some embodiments, the damper system 700 includes damper 702a, damper 702b, accumulator 704a, and accumulator 704b. Damper 702a and damper 702b may be similar, such that whatever is said of the structure of damper 702a can be said of the structure of damper 702b. Damper system 700 may represent a damper system on one axle (i.e., damper 702a is positioned on the left side of the axle, and damper 702b is positioned on the right side of the axle, or vice versa) according to some embodiments. In some embodiments, damper system 700 may represent a damper assembly with one damper (e.g., damper 702a) positioned on the front right side of a vehicle, and the other damper (e.g., damper 702b) is positioned on the rear right side of the vehicle. In some embodiments, damper 702a may be positioned on the front right side of the vehicle, while damper 702b is positioned on the rear left side of the vehicle. In some embodiments, damper 702a is damper 406 of FIGS. 6A-6B and damper 702b is damper 416 of FIGS. 6A-6B. In some embodiments, damper 702a is damper 406a of FIGS. 4A-5B and damper 702b is damper 406b of FIGS. 4A-5B. In some embodiments, damper 702a is damper 206b of FIG. 3 and damper 702b is damper 206a of FIG. 3. In some embodiments, damper 702a is damper 206a of FIG. 2 and damper 702b is damper 206b of FIG. 3.

Damper 702a may include housing 712a, damper piston 710a, and piston rod 706a as shown in FIG. 7. In some embodiments, damper 702a is a gas charged damper or a hydraulic damper. In some embodiments, damper 702a is an integrated damper having gas charged or hydraulically fluid charged damping as well as a spring. Housing 712a may be generally cylindrical having a first end 728a and a second end 730a. Damper 702a is shown to include damper piston 710a. Damper piston 710a may be generally circular and may extend substantially across an entire internal cross-section of damper 702a. Damper piston 710a may be positioned inside of damper 702a and may be configured to laterally move along substantially an entire length of damper piston 710a. In some embodiments, an outer diameter of damper piston 710a sealingly interfaces with an inner diameter of housing 712a. Damper piston 710a may divide damper 702a into a first chamber 708a, and a second chamber 714a. First chamber 708a may be defined by a first surface 732a of damper piston 710a, inner diameter of housing 712a, and first end 728a of housing 712a. Second chamber 714a may be defined by a second surface 734a of damper piston 710a, inner diameter of housing 712a, and second end 730a of housing 712a. Piston rod 706a may extend through substantially an entire length of housing 712a according to some embodiments. In some embodiments, piston rod 706a may be connected to damper piston 710a (e.g., welded, removably connected, etc.), or may be integrally formed with piston 710a. According to some embodiments, piston rod 706a may be connected to first surface 732a of damper piston 710a, extend through an entire length of first chamber 708a, and protrude through first end 728a of housing 712a. In some embodiments, piston rod 706a extends only through first chamber 708a and does not extend through second chamber 714a. According to some embodiments, piston rod 706a may be connected to second surface 734a of damper piston 710a, extend through an entire length of second chamber 714a, and protrude through second end 730a of housing 712a. In some embodiments, piston rod 706a extends only through second chamber 714a and does not extend through first chamber 708a.

First chamber 708a of damper 702a may be fluidly connected to second chamber 714b of damper 702b through fluid conduit 718 according to some embodiments. Fluid may flow out of first chamber 708a through inlet/outlet 742a, fluid conduit 718, and enter second chamber 714b of damper 702b through inlet/outlet 740b. In some embodiments, fluid flows through valve 716b before entering second chamber 714b of damper 702b through inlet/outlet 740b. In some embodiments, the fluid may flow in the opposite direction. In some embodiments, first chamber 708b of damper 702b may be fluidly connected to second chamber 714a of damper 702a through fluid conduit 720. Fluid may flow out of first chamber 708b through inlet/outlet 742b, fluid conduit 720, and enter second chamber 714a of damper 702a through inlet/outlet 740a. In some embodiments, fluid flows through valve 716a before entering second chamber 714a of damper 702a through inlet/outlet 740a. In some embodiments, fluid may flow in the opposite direction. In some embodiments, valve 716a is positioned in line with fluid conduit 720 and valve 716b may be positioned in line with fluid conduit 718.

Valve 716a and valve 716b may be configured to control the flow rate of the fluid out of second chamber 714a and second chamber 714*b*, respectively. In some embodiments, valve 716*a* and valve 716*b* are configured to control a pressure of fluid flowing out of second chamber 714*a* and second chamber 714*b*, respectively. In some embodiments, valve 716*a* and valve 716*b* may be configured to be controlled be a controller. Valve 716*a* and valve 716*b* may be pressure compensated flow regulators, according to an exemplary embodiment. In some embodiments, valve 716*a* and valve 716*b* may be orifices, flow regulators, bypass flow regulators, demand-compensated flow controllers, pressure and temperature compensated flow regulators, priority valves, deceleration valves, etc., or any other valve which may be used to control the flow rate of the fluid through flow conduit 720 and flow conduit 718. In some embodiments, valve 716*a* and valve 716*b* may control the volumetric flow rate of hydraulic fluid through flow conduit 720 and flow conduit 718, respectively. In some embodiments, valve 716*a* and valve 716*b* may control the mass flow rate of hydraulic fluid through flow conduit 720 and flow conduit 718, respectively. In some embodiments, valve 716*a* and valve 716*b* may be configured to restrict the flow rate into or out of second chamber 714*a* and second chamber 714*b*, respectively, to control the extension of damper 702*a* and damper 702*b*, respectively. For example, when damper 702*a* extends, piston rod 706*a* and piston 710*a* may move in direction 736*a*, according to some embodiments. Valve 716*a* may be configured to restrict the flow of fluid into second chamber 714*a* to restrict the extension of damper 702*a*. In some embodiments, when damper 702*a* extends, piston rod 706*a* and piston 710*a* may move in direction 738*a*. Valve 716*a* may be configured to restrict the flow out of second chamber 714*a* to restrict the extension of damper 702*a*.

In some embodiments, valve 716*a* and valve 716*b* are located near inlet/outlet 740*a* and inlet/outlet 740*b*, respectively, as shown in FIG. 7. In some embodiments, valve 716*a* and valve 716*b* may be located near inlet/outlet 742*a* and inlet/outlet 742*b*, respectively. According to some embodiments, valves may be positioned near both inlet/outlet 742*a* and inlet/outlet 742*b*, as well as near both inlet/outlet 740*a* and inlet/outlet 740*b*. In this way, the valves which are connected in line with fluid conduit 718 may cooperatively act to allow or restrict the flow of fluid into or out of the chambers of damper 702*a* and damper 702*b*.

Damper system 700 may also include accumulator 704*a* and accumulator 704*b*, as shown in FIG. 7. Accumulator 704*a* and accumulator 704*b* may be weight-loaded piston accumulators, spring-loaded piston accumulators, hydro-pneumatic piston accumulators, hydro-pneumatic diaphragm accumulators, hydro-pneumatic bladder accumulators, etc., or any other type of accumulators, according to some embodiments. According to an exemplary embodiment, accumulator 704*a* and accumulator 704*b* are hydro-pneumatic piston accumulators, as shown in FIG. 7. Accumulator 704*a* and accumulator 704*b* may be similar, such that whatever is said about the structure of accumulator 704*a* may be said of the structure of accumulator 704*b*, and vice versa. According to some embodiments, accumulator 704*a* includes a body 726*a* and a piston 724*a* dividing the body 726*a* of accumulator 704*a* into a first chamber 746*a* and a second chamber 748*a*. The first chamber 746*a* may be maintained at a set pressure and may be filled with an inert gas, according to some embodiments. In some embodiments, the inert gas in first chamber 746*a* is nitrogen. In some embodiments, piston 724*a* is configured to sealingly interface with an inner diameter of body 726*a*. Piston 724*a* may be configured to travel longitudinally along the length of body 726*a* of accumulator 704*a*. In some embodiments, the inert gas in first chamber 746*a* applies a pressure to piston 724*a*. The pressure applied to piston 724*a* by inert gas in first chamber 746*a* may be calculated by $$P = \frac{mRT}{V},$$

where P is the pressure exerted by the inert gas, m is the mass of the inert gas in first chamber 746*a*, T is the temperature of inert gas in first chamber 746*a*, and V is the volume of first chamber 746*a*. Therefore, as fluid flows into second chamber 748*a*, and piston 724*a* moves upwards (i.e., upwards defined as a direction which decreases the volume of first chamber 746*a* of accumulator 704*a*), the volume of first chamber 746*a* decreases and the pressure applied to piston 724*a* applied by the inert gas in first chamber 746*a* increases. Likewise, accumulator 704*b* includes a body 726*b* and a piston 724*b* dividing the body 726*b* into a first chamber 746*b* and a second chamber 748*b*.

Accumulator 704*a* and accumulator 704*b* may be fluidly connected to flow conduit 718 and flow conduit 720, respectively. In some embodiments, accumulator 704*a* is connected to flow conduit 718 through flow conduit 722*a* and accumulator 704*b* is connected to flow conduit 720 through flow conduit 722*b*. In some embodiments, valves similar to valve 716*a* and valve 716*b* may be present in line with flow conduit 722*a* and flow conduit 722*b*. The valves may be positioned near where flow conduit 722*a* or flow conduit 722*b* connect to flow conduit 718 and flow conduit 720, at mouth 744*a* and mouth 744*b*, respectively. In some embodiments, the valves may each be positioned near the end of flow conduit 722*a* and flow conduit 722*b* which connects to body 726*a* and body 726*b*. Valves may also be positioned anywhere else along flow conduit 722*a* and flow conduit 722*b*.

If accumulator 704*a* and accumulator 704*b* are gas-charged accumulators, accumulator 704*a* and accumulator 704*b* may be pre-charged to a specific pressure. In some embodiments, accumulator 704*a* and accumulator 704*b* may have fixed pressures. For example, if accumulator 704*a* and accumulator 704*b* are weight-charged accumulators, the weight present on piston 724*a* and piston 724*b* may apply a constant pressure.

Accumulator 704*a* and accumulator 704*b* may help to maintain system pressure when damper 702*a* and damper 702*b* extend or compress. Accumulator 704*a* and accumulator 704*b* may also help compensate for thermal extension and compression of components in damper system 700, and may absorb shocks or spikes in pressure introduced to the damper system 700 by damper 702*a* and/or damper 702*b* (e.g., by encountering a depression or a protrusion of the ground). In some embodiments, accumulator 704*a* and accumulator 704*b* may help maintain system stability in the event of impacts transferred to the damper system 700 through damper 702*a* and/or damper 702*b*, or in the event of fluid leakage out of the system.

Damper 702*a* and damper 702*b* may represent a left and right damper on either end of an axle (i.e., a front axle or a rear axle). Damper 702*a* may be the right damper and damper 702*b* may be the left damper. If a vehicle which damper system 700 is installed in makes a right hand turn, damper 702*a* may tend to extend and damper 702*b* may tend to compress due to the roll of the vehicle (discussed in greater detail above with reference to FIGS. 4A-5B).

Damper 702*b* may compress, and damper piston 710*b* and piston rod 706*b* may travel within housing 712*b* in direction 738*b*. Damper 702*a* may extend, and damper piston 710*a* and piston rod 706*a* may travel within housing 712*a* in direction 736*a*. If the damper system 700 is "deactivated," valve 716*a* and valve 716*b* may be configured to allow hydraulic fluid to flow freely. When the damper system 700 is "deactivated" and the vehicle makes a right hand turn, fluid may be forced to exit second chamber 714*b* through inlet/outlet 740*b*, travel through valve 716*b* unrestricted, and flow through flow conduit 718, entering either first chamber 708*a* through inlet/outlet 742*a* and/or entering accumulator 704*a* through flow conduit 722*a*. Fluid in first chamber 708*a* may be forced to exit first chamber 708*a* through inlet/outlet 742*a* and may oppose the flow out of second chamber 714*b* through flow conduit 718. The fluid flow from second chamber 714*b* of damper 702*b* and the fluid flow from first chamber 708*a* of damper 702*a* may be in opposition to each other, and this may provide improved ride stability. Alternatively, the fluid exiting second chamber 714*b* of damper 702*b* and the fluid exiting first chamber 708*a* of damper 702*a* may both flow into chamber 748*a* of accumulator 704*a* through mouth 744*a* and flow conduit 722*a*. In this way, the pre-charged pressure of chamber 746*a* of accumulator 704*a* may facilitate the amount of fluid allowed to enter chamber 748*a* of accumulator 704*a*. Consequently, the amount of fluid allowed to exit second chamber 714*b* of damper 702*b* and the amount of fluid allowed to exit first chamber 708*a* may restrict the amount of extension of damper 702*a* and the amount of compression of damper 702*b*.

When the vehicle makes a right hand turn and the damper system 700 is "deactivated," fluid may also flow into second chamber 714*a* of damper 702*a* through inlet/outlet 740*a* and flow conduit 720. Fluid may also flow into first chamber 708*b* of damper 702*b* through inlet/outlet 742*b*. Fluid may exit chamber 748*b* of accumulator 704*b*, flow through flow conduit 722*b* and mouth 744*b*. The fluid may then flow into first chamber 708*b* of damper 702*b* and second chamber 714*a* of damper 702*a* through flow conduit 720. Since the pressure on piston 724*b* aids the flow of fluid out of chamber 748*b* of accumulator 704*b*, the amount of fluid exiting chamber 748*b* of accumulator 704*b* may depend on the extension and compression of damper 702*a* and damper 702*b*, respectively.

If, however, the system is "activated," the flow of fluid through flow conduit 718 and flow conduit 720 may be restricted by valve 716*b* and/or valve 716*a*, respectively. As the vehicle makes a right hand (or left hand) turn, damper 702*a* may tend to extend, if damper 702*a* is the right damper (or left damper during a left hand turn). Damper 702*a* may extend by damper piston 710*a* and piston rod 706*a* moving in direction 736*a*. If, however, valve 716*a* restricts the flow of fluid into second chamber 714*a* of damper 702*a*, damper 702*a* may be prevented from extending, or the extension of damper 702*a* may be limited. In some embodiments, valve 716*a* may completely restrict the flow of fluid into second chamber 714*a* of damper 702*a*. In some embodiments, valve 716*a* may only partly restrict the flow of fluid into the second chamber 714*a* of damper 702*a*. In some embodiments, valve 716*a* may allow damper 702*a* to extend a certain amount, by allowing a certain amount of fluid to flow into second chamber 714*a* of damper 702*a*. After damper 702*a* has been allowed to extend the certain amount, valve 716*a* may be configured to then completely restrict or partially restrict the flow of fluid into second chamber 714*a* of damper 702*a*. In some embodiments, the operation of valve 716*a* depends on the amount of extension of damper 702*a*. For example, as damper 702*a* extends by damper piston 710*a* and piston rod 706*a* moving in direction 736*a*, valve 716*a* may be configured to increasingly restrict the flow of fluid through valve 716*a* based on the amount of extension of damper 702*a*. The relationship between the amount of restriction of valve 716*a* and the amount of extension of damper 702*a* may be linear, or may be a nonlinear relationship (e.g., parabolic, exponential, etc.).

Valve 716*a* may be positioned at inlet/outlet 742*a* of flow conduit 718, according to some embodiments. In some embodiments, valve 716*a* may be configured to restrict the flow out of first chamber 708*a* of damper 702*a*, similar to the configuration where valve 716*a* restricts the flow of fluid into second chamber 714*a* of damper 702*a*. In some embodiments, there may be two valves 716*a*, with one being positioned at inlet/outlet 742*a* of flow conduit 718 and being configured to control the flow of fluid out of first chamber 708*a* of damper 702*a*, and another valve 716*a* positioned at inlet/outlet 740*a* of flow conduit 720 being configured to control the flow of fluid into second chamber 714*a* of damper 702*a*. These two valves 716*a* may be configured to cooperatively control the extension of damper 702*a* according to some embodiments.

While the extension of damper 702*a* may be controlled through valve 716*a*, or two valves 716*a*, damper 702*a* may still be allowed to compress. For example, if the vehicle makes a right hand turn, damper 702*a* may be restricted from extending, but still may be allowed to compress if the vehicle hits a bump or any other disturbance which may cause damper 702*a* to compress. If damper 702*a* compresses during the right hand turn, damper piston 710*a* and piston rod 706*a* may move in direction 738*a*. This may force fluid to exit second chamber 714*a* and force fluid to enter first chamber 708*a*. The fluid which exits second chamber 714*a* may be allowed to flow through valve 716*a* and flow conduit 720. The fluid may then enter either first chamber 708*b* of damper 702*b*, or it may enter chamber 748*b* of accumulator 704*b*. The fluid which enters first chamber 708*a* of damper 702*a* may be supplied from chamber 748*a* of accumulator 704*a*, or it may be supplied from second chamber 714*b* of damper 702*b* according to some embodiments.

While the extension of damper 702*a* may be controlled through valve 716*a* or two valves 716*a*, damper 702*b* may still be allowed to compress during the right hand turn. In the case of making the right hand turn, the roll of the vehicle may cause damper 702*b* to compress. Damper 702*b* may compress by damper piston 710*b* and piston rod 706*b* moving in direction 738*b*. As damper piston 710*b* and piston rod 706*b* move in direction 738*b*, fluid may be forced to exit second chamber 714*b*, and fluid may be forced to enter first chamber 708*b*. Fluid may exit second chamber 714*b* through inlet/outlet 740*b* and may be allowed to pass through valve 716*b* unrestricted. The fluid may then flow through flow conduit 718 and may enter chamber 748*a* of accumulator 704*a* through flow conduit 722*a*. While valve 716*b* may allow fluid to exit second chamber 714*b* substantially unrestricted, valve 716*b* may be configured to restrict the flow of fluid exiting second chamber 714*b* in some embodiments. The fluid entering first chamber 708*b* of damper 702*b* may be supplied from chamber 748*b* of accumulator 704*b*. As damper 702*a* is restricted from extending and damper 702*b* compresses, the center of gravity of the vehicle may lower, resulting in better ride stability.

Damper 702*a* and damper 702*b* may be configured to operate during a left hand turn similarly to the description above with reference to the right hand turn. However, if the vehicle is making a left hand turn, the operation of damper 702b may operate similarly to the operation of damper 702a during the right hand turn, and the operation of damper 702a may operate similarly to the operation of damper 702b during the right hand turn. In some embodiments, damper 702a may be a front damper of the vehicle, and damper 702b may be a rear damper of the vehicle. Damper 702a and damper 702b may be configured to operate similarly as described above with reference to the right hand turn and left hand turn, but in response to the vehicle accelerating or decelerating (i.e., braking). While damper 702a and damper 702b may operate similarly to the left and right hand turning operation, the amount of restriction of the fluid flow during acceleration or deceleration may be different than the amount of restriction of the fluid flow required to stabilize the vehicle during left and right hand turns. In some embodiments, the amount of restriction of the fluid flow during deceleration (i.e., braking) may be higher than the amount of restriction of the fluid flow during acceleration, since the vehicle may decelerate (i.e., brake) more rapidly than the vehicle can accelerate, resulting in the vehicle pitching forward a greater magnitude during deceleration than the vehicle pitches rearwards during acceleration.

Valves 716 may be integrated into the dampers 702, according to some embodiments. In some embodiments, valves 716 are integrally formed with a manifold of dampers 702. Valves 716 may also be disposed in a valve block according to some embodiments. In some embodiments, the valve block may include relief valves configured to relieve pressure of the damper system 700 if the pressure of the damper system 700 exceeds a threshold value at any location in the damper system 700. Valves 716 may be configured to be controlled by a controller according to some embodiments. In some embodiments, valves 716 may restrict the extension and/or compression of dampers 702 based on information regarding any of a steering wheel, an accelerator pedal, a brake pedal, a wheel position sensor, a wheel speed sensor, a speedometer, the extension or compression amount of dampers 702, a user interface, a yaw rate of the vehicle, a lateral acceleration of the vehicle, a roll and/or pitch amount of the vehicle, strain gauges, stress gauges, or any other dynamic properties of the vehicle, or any information from a sensor which is correlated to the dynamic properties of the vehicle.

In some embodiments, four dampers 702 may be implemented in the damper system 700. The four dampers 702 may each be positioned at a wheel of the vehicle, according to some embodiments. In some embodiments, all four of the dampers 702 are fluidly connected. Any of the dampers 702 may be fluidly connected to any of the other dampers 702. For example, in some embodiments, a front right damper 702 may be fluidly connected to a rear left damper 702, and a front left damper 702 may be fluidly connected to a rear right damper 702 of the vehicle. In some embodiments, dampers 702 may each be fluidly connected to one or more three-way valves. The three-way valves may be configured to adjust the fluid connection of the dampers 702 according to some embodiments. In some embodiments, the three-way valves may be configured to be controlled by a controller, and may be configured to transition the damper system 700 from one mode of operation to another. For example, in one configuration, three-way valves may fluidly connect the front left damper 702 with the front right damper 702, and the rear left damper 702 with the rear right damper 702. The front left damper 702 and the front right damper 702 may then be configured to operate to lower the center of gravity of the vehicle while making left and right hand turns or to provide better ride stability during left and right hand turns. The rear left damper 702 and the rear right damper 702 may also be configured to operate to lower the center of gravity of the vehicle while making left and right hand turns. In another configuration, three-way valves may fluidly connect the front left damper 702 with the rear left damper 702, and the front right damper 702 with the rear right damper 702, as well as fluidly connecting the front right damper 702 with the rear right damper 702. The front right damper 702 and the rear right damper 702, as well as the front left damper 702 and the rear left damper 702 may then be configured to operate to lower the center of gravity of the vehicle during acceleration and deceleration, and/or to improve the ride stability of the vehicle during acceleration and deceleration. In some embodiments, any other multi-directional valves may be used in place of the three-way valves in order to transition the damper system 700 into different modes of operation, or a combination of multi-directional valves may be used.

In some embodiments, more than two accumulators 704 may be used. Each damper 702 may have a corresponding accumulator 704, according to some embodiments.

Accumulators 704 may be configured to be fluidly connected to the multi-directional valves, such that when the multi-directional valves adjust the operation of the damper system 700, the operation of accumulators 704 may also be adjusted, according to some embodiments. In some embodiments, all of the accumulators 704 have the same pre-charged pressure.

Figure 8A:
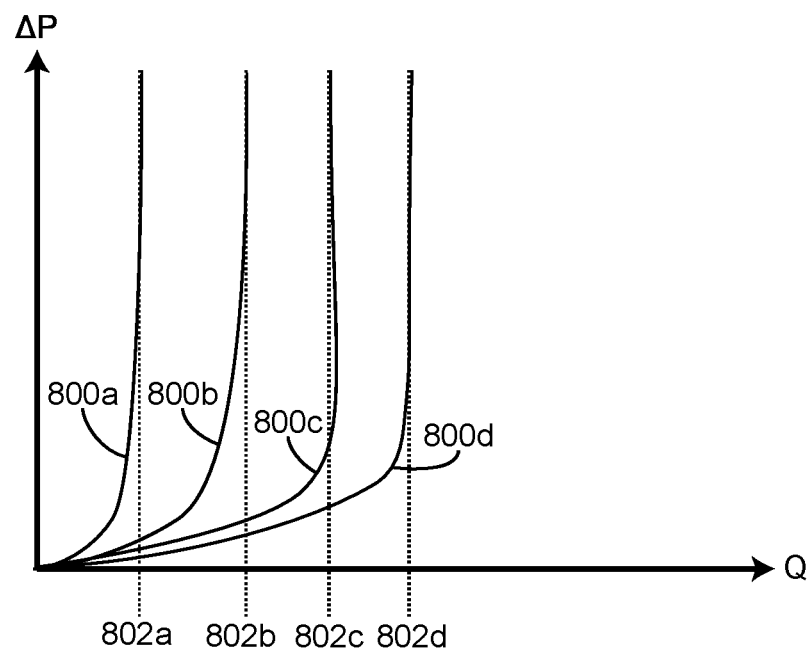
FIG. 8A is a graph of pressure differential versus volumetric flow rate output of a pressure compensated flow valve, according to an exemplary embodiment.
Figure 8B:
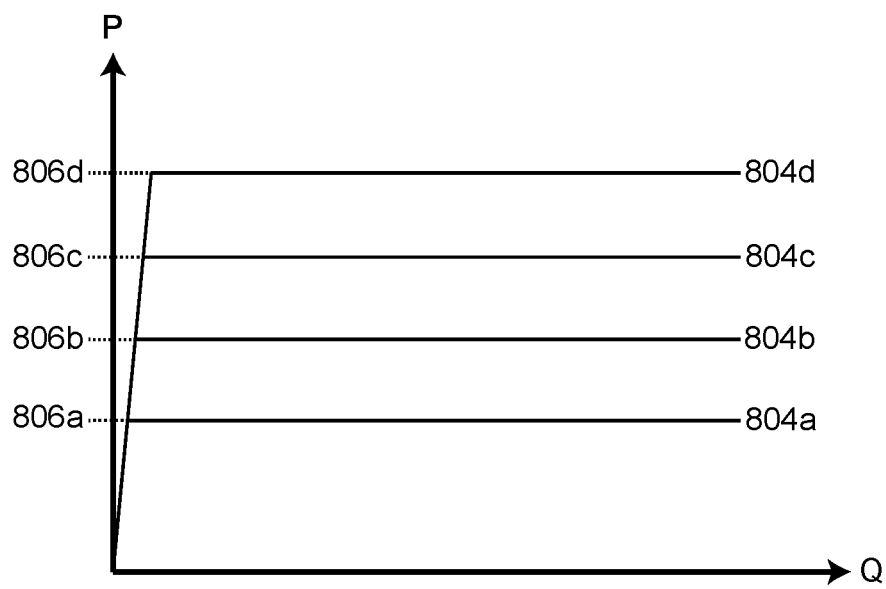
FIG. 8B is a graph of pressure input versus volumetric flow rate output of a proportional variable relief valve, according to an exemplary embodiment.

Referring now to FIGS. 8A-8B, two graphs relating pressure (P) to volumetric flow rate (Q) are depicted, according to some embodiments. FIG. 8A may represent a function of pressure compensated flow valve (e.g., any of valves 1016 and/or valves 904), and FIG. 8B may represent a function of proportional variable relief valve. Either pressure compensated flow valve or proportional variable relief valve may be used to control the extension and/or compression of dampers as described above.

Referring now to FIG. 8A, series 800a-8s00d of the function of pressure compensated flow valve are shown, according to some embodiments. The Y-axis may represent a pressure differential across pressure compensated flow valve, and the X-axis may represent volumetric flow rate exiting pressure compensated flow valve. Pressure compensated flow valve may include a needle configured to adjust an orifice which may restrict and control the flow of fluid through pressure compensated flow valve. Additionally, pressure compensated flow valve may include a compensator spool biased by a spring with a certain stiffness. A position of compensator spool may depend on the spring, as well as the pressure differential across pressure compensated flow valve. Compensator spool may be configured to maintain constant a pressure differential across the orifice. Volumetric flow rate of the fluid through the orifice may depend on a cross sectional area of the orifice, the pressure differential across the orifice, and various constants (e.g., geometric constants, fluid property constants, etc.). Since the compensator spool maintains constant the pressure differential across the orifice, and when the needle is set to a specific value, the cross sectional area of the orifice remains constant, the volumetric flow rate of the fluid through the orifice remains constant and therefore the volumetric flow rate of the fluid exiting pressure compensated flow valve remains constant.

Series 800a-800d may represent different positions of the needle of pressure compensated flow valve, corresponding to different volumetric flow rates. As the needle changes position, the cross sectional area of the orifice changes, however the pressure differential across the orifice remains relatively stable. As the pressure differential across the pressure compensated flow valve increases, volumetric flow rate may maintain a relatively constant/stable value due to the constant pressure differential across the orifice and the constant cross-sectional area of the orifice. For example, series 800a may generally maintain volumetric flow rate 802a, according to some embodiments. Volumetric flow rate of series 800a may remain relatively stable and constant, despite the pressure differential across pressure compensated flow valve changing, since the compensator spool may maintain the constant pressure differential across the orifice. Fluctuations in volumetric flow rate of series 800a-800d may be due to other factors changing. For example, if a temperature of the fluid increases or decreases slightly, viscosity of the fluid may change, which may slightly affect the volumetric flow rate. In some embodiments, pressure compensated flow valve may also compensate for temperature changes (i.e., pressure compensated flow valve may be a pressure and temperature compensated flow valve), which may provide additional stability of the volumetric flow rate exiting pressure compensated flow valve.

Referring now to FIG. 8B, series 804a-804d of the function of proportional variable relief valve are shown, according to some embodiments. The Y-axis may represent a pressure differential across proportional variable relief valve, and the X-axis may represent volumetric flow rate exiting the proportional variable relief valve. In some embodiments, proportional variable relief valve may include a first spring, and a second adjustable spring. The first spring may bias the proportional variable relief valve into a closed configuration by biasing a first poppet into a closed configuration, according to some embodiments. The second adjustable spring may bias a second poppet into a closed position. As fluid flows through proportional variable relief valve, fluid may apply a relatively negligible pressure differential across the first poppet. Since the pressure differential across the first poppet is relatively negligible (i.e., it is not large enough to overcome force applied to the first poppet by the first spring), the first poppet remains in a closed configuration. If a pressure of the fluid entering the proportional variable relief valve exceeds a minimum value required to open the second poppet (by overcoming the force applied by the second adjustable spring), the second poppet moves into an opened configuration, and the pressure differential across the first poppet may become non-negligible due to the open configuration of the second poppet and the flow of fluid past the second poppet. The first poppet may open, allowing fluid to pass through the proportional variable relief valve. The pressure at which the proportional variable relief valve allows fluid to flow through at may be changed by adjusting a stiffness of the second adjustable spring. The stiffness of the second adjustable spring may be configured to be adjusted by an actuator, according to some embodiments. In some embodiments, the stiffness of the second adjustable spring may be configured to be adjusted by an electronic actuator.

Series 804a-804d may represent different configurations of proportional variable relief valve due to different stiffnesses of adjustable second spring. For example, series 804a may represent proportional variable relief valve having a second adjustable spring stiffness of a first value, and series 804b may represent proportional variable relief valve having a second adjustable spring stiffness of a second value. The pressure value at which the proportional variable relief valve allows fluid to flow through may be referred to as a relief pressure. In some embodiments, as second adjustable spring is increased in stiffness, the relief pressure increases.

Referring still to FIG. 8B, as pressure increases, volumetric flow rate remains relatively negligible. In some embodiments, there may be no volumetric flow rate through proportional variable relief valve before the relief pressure has been met. When the relief pressure is met (e.g., when series 804a reaches pressure 806a, or when series 804b reaches pressure 806b, etc.), fluid may be allowed to flow through proportional variable relief valve.

Figure 9:
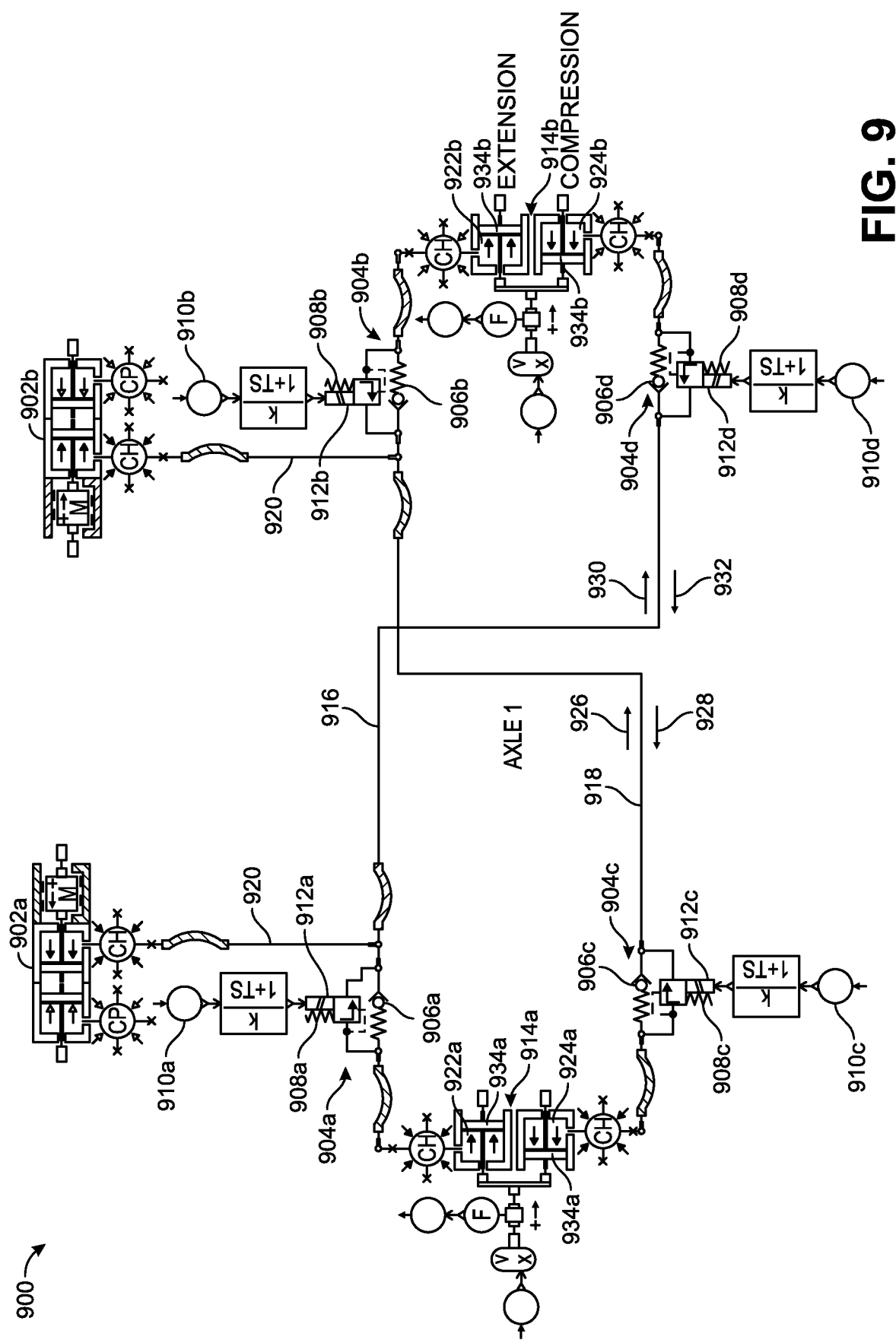
FIG. 9 is a diagram of a hydraulic damper system, according to an exemplary embodiment.

Referring now to FIG. 9, a suspension diagram 900 is shown, according to an exemplary embodiment. Suspension diagram 900 is shown to include accumulators 902, dampers 914, and valves 904 (e.g., pressure compensated flow valves or proportional variable relief valves). Valves 904 may be positioned on both sides of dampers 914 and may be fluidly connected to dampers 914, according to some embodiments. Valves 904 are each shown to include a check valve 906. Check valve 906 may be configured to allow fluid flow in only one direction, and to force the fluid to flow through valve 904 when the fluid flows in the opposite direction. For example, check valve 906 may allow fluid to flow in a direction to facilitate compression of dampers 914, however when fluid flows in the opposite direction to facilitate extension of dampers 914, check valve 906 may close, forcing the fluid to flow through valve 904, where the flow rate of the fluid can be controlled.

Valves 904 may control flow rate of fluid facilitating the extension of dampers 914. Valves 904 may include a needle which may be controlled by an actuator 912 and may biased into an open position by spring 908, according to some embodiments. The needle may configured to restrict the flow of fluid through valves 904 based on its position.

Still referring to FIG. 9, damper 914a is shown to be fluidly connected to damper 914b through flow conduit 916 and flow conduit 918, according to some embodiments. Flow conduit 916 may fluidly connect a first chamber of damper 914a with a second chamber of damper 914b, and flow conduit 918 may fluidly connect a second chamber of damper 914a with a first chamber of damper 914b, according to some embodiments. As damper 914a extends, fluid may freely enter second chamber 924a of damper 914a through flow conduit 918 in direction 928. Fluid may freely pass through check valve 906c in direction 928. As damper 914a extends, fluid exits first chamber 922a of damper 914a through flow conduit 916 in direction 930. When fluid flows out of first chamber 922a of damper 914a, it cannot flow through check valve 906a. Instead, the fluid flowing out of first chamber 922a of damper 914a flows through valve 904a. The flow of fluid exiting first chamber 922a of damper 914a may be controlled with valve 904a, and therefore the extension of damper 914a may be controlled. If damper 914b compresses while damper 914a is extending, fluid may be forced to enter second chamber 924b of damper 914b and fluid may be forced to exit first chamber 922b of damper 914b. The fluid entering second chamber 924b may flow through flow conduit 916 in direction 930 and may be allowed to freely flow through check valve 906d in this direction. The fluid exiting first chamber 922b of damper 914b may be forced to pass through valve 904b. Valve 904b may be configured to either restrict the flow of fluid out of first chamber 922b of damper 914b, or to allow the fluid to pass through freely. In some embodiments, damper 914a and damper 914b are any of damper 702a, damper 702b, damper 406a, damper 406b, damper 416a, damper 416b, damper 206a, and damper 206b.

Figure 10:
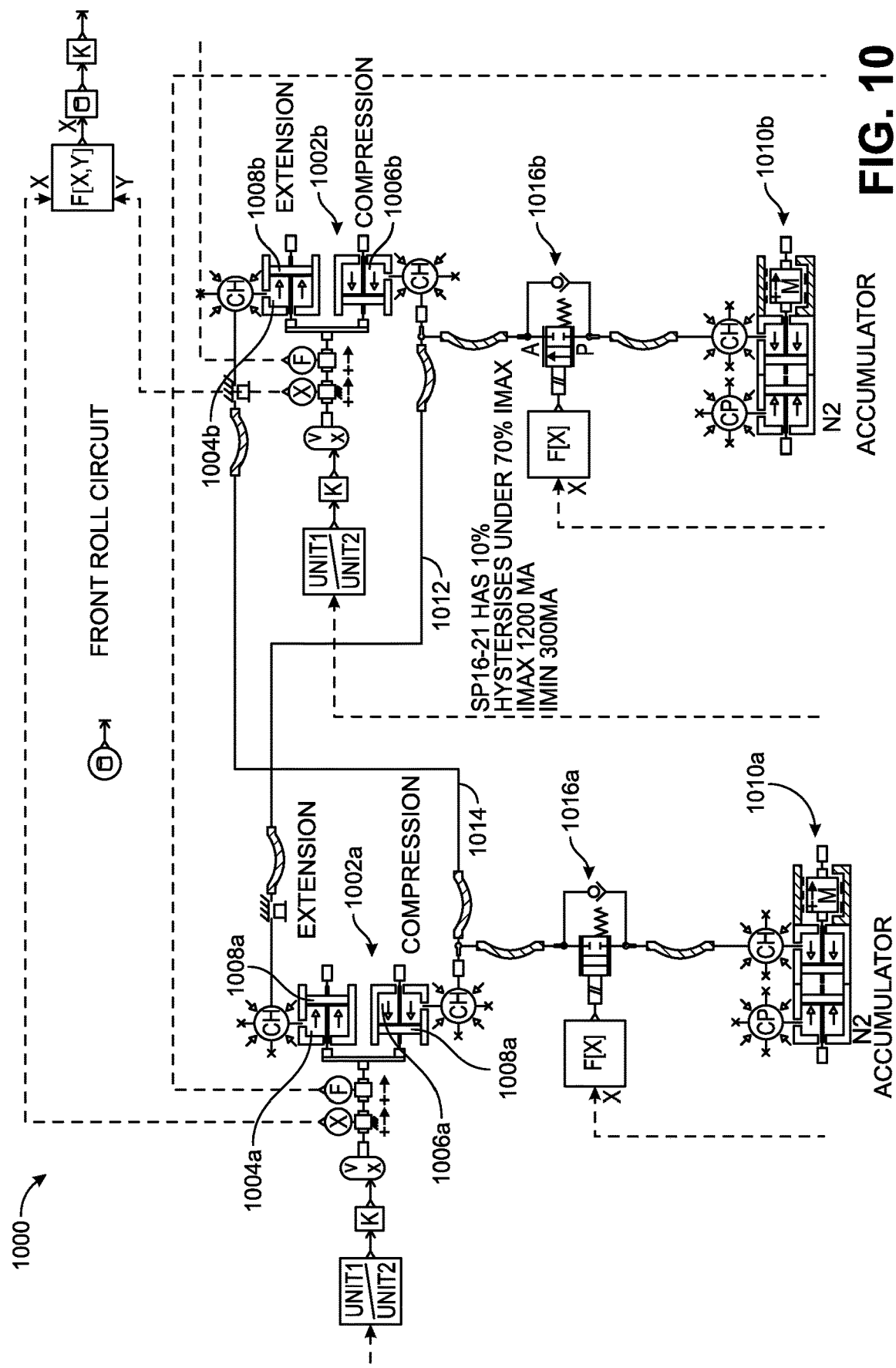
FIG. 10 is a diagram of a hydraulic damper system, according to an exemplary embodiment.

Referring now to FIG. 10, a suspension system 1000 is shown, according to an exemplary embodiment. Suspension system 1000 is shown to include dampers 1002, having piston 1008 dividing each damper 1002 into first chamber 1004 and second chamber 1006. Suspension system 1000 is further shown to include accumulators 1010, as well as valves 1016 (e.g., pressure compensated flow valves), according to some embodiments. Valves 1016 are shown to control the flow of fluid into accumulators 1010 according to some embodiments. Damper 1002a is shown to be fluidly connected to damper 1002b, such that first chamber 1004a of damper 1002a is fluidly connected with second chamber 1006b of damper 1002b through fluid line 1012, and second chamber 1006a of damper 1002a is fluidly connected to first chamber 1004b of damper 1002b through fluid line 1014. Accumulator 1010a is shown fluidly connected in line with fluid line 1014, and accumulator 1010b is shown fluidly connected in line with fluid line 1012.

If damper 1002a extends (i.e., due to a turn or acceleration/deceleration), fluid is forced to exit second chamber 1006a and fluid is forced to enter first chamber 1004a of damper 1002a. As fluid exits second chamber 1006a of damper 1002a, fluid may be forced to enter accumulator 1010a, according to some embodiments. Fluid entering accumulator 1010a may be controlled by valve 1016a, according to some embodiments. As fluid is forced to enter first chamber 1004a of damper 1002a, fluid flows out of second chamber 1006b of damper 1002b. The fluid may be allowed to flow freely out of second chamber 1006b of damper 1002b and also out of accumulator 1010b into first chamber 1004a of damper 1002a. However, the extension of damper 1002a may be controlled by controlling valve 1016a. In this way, the ride stability of a vehicle may be controlled by restricting the extension of damper 1002 (or similarly restricting the extension of damper 1002b by restricting a flow of fluid into accumulator 1010b). For example, the ride stability of the vehicle may be improved/controlled by preventing the vehicle from rolling during a turn or from pitching (e.g., pitching forwards or pitching backwards) during an acceleration or deceleration by controlling extension of at least one of damper 1002a and damper 1002b by controlling the flow of fluid into at least one of accumulator 1010a and accumulator 1010b. In this way, the ride stability of the vehicle may be improved/controlled by adjusting an operation of at least one of pressure compensated valve 1010a and pressure compensated valve 1010b. In some embodiments, damper 1002a and damper 1002b are any of damper 702a, damper 702b, damper 406a, damper 406b, damper 416a, damper 416b, damper 206a, and damper 206b.

In some embodiments, as fluid exits accumulators 1010 (e.g., as fluid flows out of accumulator 1010a in direction 1022a), the fluid is forced to pass through a one-way valve 1018. For example, each valve 1016 can include a bypass circuit that includes the one-way valve 1018. Fluid that exits accumulators 1010 (e.g., flows in direction 1022a or 1022b out of accumulator 1010a or accumulator 1010b, respectively) is forced to flow through one-way valve 1018a. Likewise, fluid that enters accumulators 1010 (e.g., accumulator 1010a and/or accumulator 1010b) may be restricted from flowing through the one-way valve 1018 and may be forced to flow through valve 1016. For example, fluid flowing into accumulator 1010a in direction 1024a may be restricted from flowing through one-way valve 1018, thereby being forced to flow through valve 1016a, which can be controlled to achieve a desired damping in the extension or compression of damper 1002a.

Figure 11A:
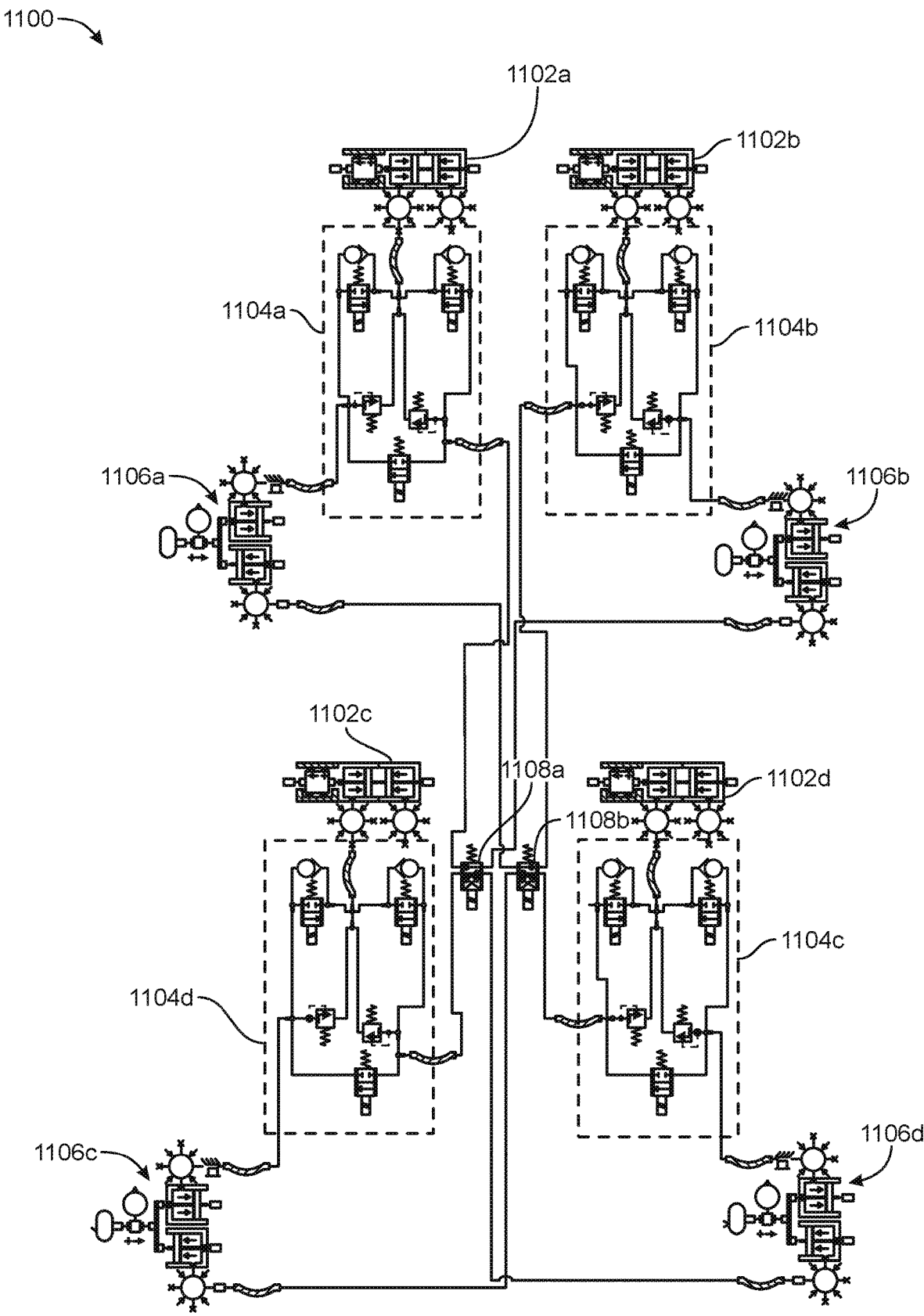
FIG. 11A is a diagram of a hydraulic damper system, according to an exemplary embodiment.
Figure 11B:
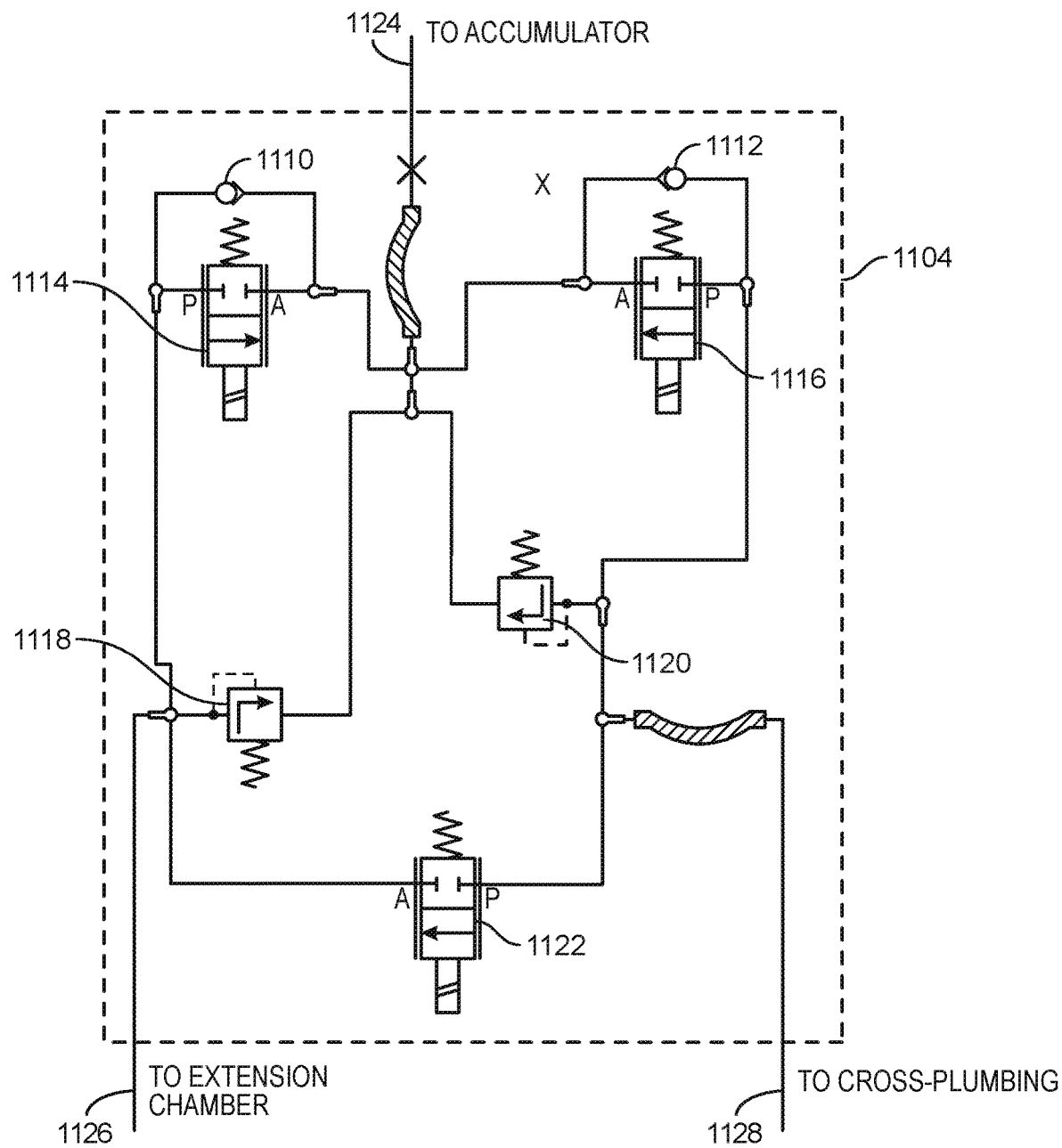
FIG. 11B is a diagram of a portion of the hydraulic damper system of FIG. 11A, according to an exemplary embodiment.

Referring particularly to FIGS. 11A-11B, a suspension system 1100 is shown, according to another embodiment. Suspension system 1100 can be similar to suspension system 1000 as described in greater detail above with reference to FIG. 10, and may include any of the components, features, functionality, etc., of the suspension system 1000. In some embodiments, suspension system 1100 is usable with vehicle 110.

Referring particularly to FIG. 11A, suspension system 1100 includes a first accumulator 1102a, a second accumulator 1102b, a third accumulator 1102c, and a fourth accumulator 1102d. Suspension system 1100 also includes a first damper 1106a, a second damper 1106b, a third damper 1106c, and a fourth damper 1106d. Dampers 1106a-1106d can be the same as or similar to any of the other dampers described herein (e.g., dampers 416, dampers 1002, dampers 406, dampers 702, dampers 206, etc.), and may include a first or extension chamber and a second or a compression chamber that is defined by a piston that sealingly couples with an interior or inwards facing surface of a damper housing. Suspension system 1100 can also include a first accumulator fluid circuit 1104a, a second accumulator fluid circuit 1104b, a third accumulator fluid circuit 1104c, and a fourth accumulator fluid circuit 1104d. Each damper 1106 may be associated with a corresponding one of the accumulator fluid circuits 1104a-1104d, and a corresponding one of the accumulators 1102a-1102d. For example, the first damper 1106a may be associated with the first accumulator fluid circuit 1104a and the first accumulator 1102a, while the second damper 1106b may be associated with the second accumulator fluid circuit 1104b, etc.

Referring still to FIG. 11A, suspension system 1100 includes a first cross-plumbed valve 1108a, and a second cross-plumbed valve 1108b. In some embodiments, the first cross-plumbed valve 1108a and the second cross-plumbed valve 1108b are configured to facilitate a selectably cross-plumbed fluid system between the accumulator fluid circuits 1104a-1104d, the dampers 1106a-1106d, etc. Cross-plumbed valves 1108a-1108b can each be selectably transitionable (e.g., by a controller such as controller 1206) between various states.

In some embodiments, first damper 1106a and second damper 1106b are front dampers of the vehicle on which suspension system 1100 is configured. Likewise, third damper 1106c and fourth damper 1106d may be rear dampers of the vehicle in which suspension system 1100 is configured. In some embodiments, the first damper 1106a, the second damper 1106b, the first accumulator 1102a, the second accumulator 1102b, the first accumulator fluid circuit 1104a, and the second accumulator fluid circuit 1104b define a front roll circuit of suspension system 1100. Likewise, In some embodiments, first cross-plumbed valve 1108a is fluidly coupled with the first accumulator 1102a (e.g., through the first accumulator fluid circuit 1104a), the compression chamber of second damper 1106b, the compression chamber of fourth damper 1106, and the third accumulator 1102c (e.g., through the third accumulator fluid circuit 1104d). In some embodiments, the first cross-plumbed valve 1108a is selectably transitionable between a first state and a second state. In the first state, the first cross-plumbed valve 1108 fluidly couples the first accumulator circuit 1104a with the compression chamber of the second damper 1106b, and fluidly couples the third accumulator fluid circuit 1104c with the compression chamber of the fourth damper 1106d. In the second state, the first cross-plumbed valve 1108 fluidly couples the first accumulator fluid circuit 1104a with the compression chamber of the fourth damper 1106d, and fluidly couples the third accumulator fluid circuit 1104c with the compression chamber of the second damper 1106b. In some embodiments, fluidly coupling a compression chamber of one of the dampers 1106a-1106d with an accumulator fluid circuit 1104 has an effect of fluidly coupling the compression chamber with the extension chamber of the damper 1106 that corresponds to the accumulator fluid circuit 1104.

In this way, the first cross-plumbed valve 1108 can transition between the first and the second state to selectably fluidly couple the first accumulator fluid circuit 1104a and the third accumulator fluid circuit 1104c with the compression chamber of the second damper 1106b or the compression chamber of the fourth damper 1106d.

In some embodiments, second cross-plumbed valve 1108b is fluidly coupled with the compression chamber of the first damper 1106a, the second accumulator fluid circuit 1104b, the fourth accumulator fluid circuit 1104d, and the compression chamber of the third damper 1106c. In some embodiments, second cross-plumbed valve 1108b is selectably transitionable between a first state and a second state. When second cross-plumbed valve 1108b is in the first state, the compression chamber of the first damper 1106a is fluidly coupled with the second accumulator fluid circuit 1104b through second cross-plumbed valve 1108b, and the compression chamber of the third damper 1106c is fluidly coupled with the fourth accumulator fluid circuit 1104d. When the second cross-plumbed valve 1108b is in the second state, the compression chamber of the first damper 1106a is fluidly coupled with the fourth accumulator fluid circuit 1104d, and the compression chamber of the third damper 1106c is fluidly coupled with the second accumulator fluid circuit 1104b through the second cross-plumbed valve 1108b.

In this way, the second cross-plumbed valve 1108 can transition between the first and the second state to selectably fluidly couple the second accumulator fluid circuit 1104b and the fourth accumulator fluid circuit 1104d with the compression chamber of the first damper 1106a and/or the compression chamber of the third damper 1106c.

In some embodiments, the first cross-plumbed valve 1108a and the second cross-plumbed valve 1108b are configured to transition between their first states and their second states simultaneously. For example, the first cross-plumbed valve 1108a and the second cross-plumbed valve 1108b may be both transitioned into their first states, or may be both transitioned into their second states. In other embodiments, the first cross-plumbed valve 1108a may be transitioned into its first state while the second cross-plumbed valve 1108 is transitioned into its second state, or vice versa.

Referring particularly to FIG. 11B, one of accumulator fluid circuits 1104 is shown, according to some embodiments. Accumulator fluid circuit 1104 as shown in FIG. 11B may be the same or similar for any of the accumulator fluid circuits 1104a-1104d as shown in FIG. 11A and described in greater detail above.

Accumulator fluid circuit 1104 includes a first pressure compensated flow valve 1114, a second pressure compensated flow valve 1116, and a third pressure compensated flow valve 1122, according to an exemplary embodiment. In some embodiments, accumulator fluid circuit 1104 also includes a first proportional variable relief valve 1118 and a second proportional variable relief valve 1120. Accumulator fluid circuit 1104 fluidly couples with a corresponding one of accumulators 1102a-1102d through a conduit, a tubular member, a pipe, a hose, etc., shown as accumulator conduit 1124. Accumulator fluid circuit 1104 fluidly couples with a corresponding chamber (e.g., an extension chamber) of a corresponding one of dampers 1106a-1106d through a conduit, a tubular member, a pipe, a hose, etc., shown as damper conduit 1126. Accumulator fluid circuit 1104 fluidly couples with a corresponding connector portion of one of first cross-plumbed valve 1108a or second cross-plumbed valve 1108b through a conduit 1128. For example, the first accumulator fluid circuit 1104 fluidly couples with the first accumulator 1102a through its respective accumulator conduit 1124, fluidly couples with the extension chamber of the first damper 1106a through its respective damper conduit 1126, and fluidly couples with the first cross-plumbed valve 1108a through its conduit 1128. Likewise, the second accumulator fluid circuit 1104b fluidly couples with the second accumulator 1102b through its respective damper conduit 1126, fluidly couples with the extension chamber of the second damper 1102b through its damper conduit 1126, and fluidly couples with the second cross-plumbed valve 1108b through its conduit 1128. Similarly, the third accumulator fluid circuit 1104c fluidly couples with the third accumulator 1102c through accumulator conduit 1124, fluidly couples with the extension chamber of the third damper 1106c through its damper conduit 1126, and fluidly couples with the first cross-plumbed valve 1108a. The fourth accumulator fluid circuit 1104d fluidly couples with the fourth accumulator 1102d through its accumulator conduit 1124, fluidly couples with the extension chamber of the fourth damper 1106d through its damper conduit 1126, and fluidly couples with the second cross-plumbed valve 1108b through its conduit 1128.

In some embodiments, the accumulator fluid circuit 1104 includes a first one-way valve 1110 associated with the first pressure compensated flow valve 1114, and a second one-way valve 1112 associated with the second pressure compensated flow valve 1112. In some embodiments, the first one-way valve 1110 associated with the first pressure compensated flow valve 1114 biases fluid to pass through the pressure compensated flow valve 1114 when fluid flows in a first direction (e.g., into the associated accumulator 1102 or out of the associated accumulator 1102) and allows fluid to pass through when the fluid flows in a second, opposite, direction (e.g., out of the associated accumulator 1102 or into the associated accumulator 1102). Likewise, the second one-way valve 1112 associated with the second pressure compensated flow valve 1116 may function similarly such that when fluid flows in a first direction (e.g., out of the associated accumulator 1102), fluid is allowed to pass through the second one-way valve 1112, but when fluid flows in a second direction (e.g., into the associated accumulator 1102), fluid is forced to flow through the second pressure compensated flow valve 1116.

In some embodiments, the first proportional variable relief valve 1118 and the second proportional variable relief valve 1120 provide a bypass fluid circuit between the damper conduit 1126 and the conduit 1128 and the associated one of the first pressure compensated flow valve 1114 and the second pressure compensated flow valve 1116. For example, the first proportional variable relief valve 1118 may provide a bypass flow path such that extra fluid that does not pass through the first pressure compensated flow valve 1114 to the accumulator 1104 may pass through the first proportional variable relief valve 1118 (e.g., if the fluid exceeds a certain pressure). Likewise, the second proportional variable relief valve 1120 may provide a bypass flow path such that extra fluid that does not pass through the second pressure compensated flow valve is provided to the accumulator 1104 through the second proportional variable relief valve 1120 (e.g., if the fluid exceeds a certain pressure).

The third pressure compensated flow valve 1122 can be positioned between the conduit 1128 and the damper conduit 1126 and may be fluidly coupled with the conduit 1128 and the damper conduit 1126. In some embodiments, fluid may pass between the damper conduit 1126 and the conduit 1128 through the third pressure compensated flow valve 1122.

As shown in FIGS. 11A-11B, solid lines that connect the various elements may represent hoses, tubular members, conduits, pipes, etc., or any other line or member that can fluidly couple the various elements described herein. Any of the proportional variable relief valves, pressure compensated flow valves, etc., of FIGS. 11A-11B as described herein may be controlled, adjusted, etc., by controller 1206 as described in greater detail below with reference to FIG. 12.

Figure 12:
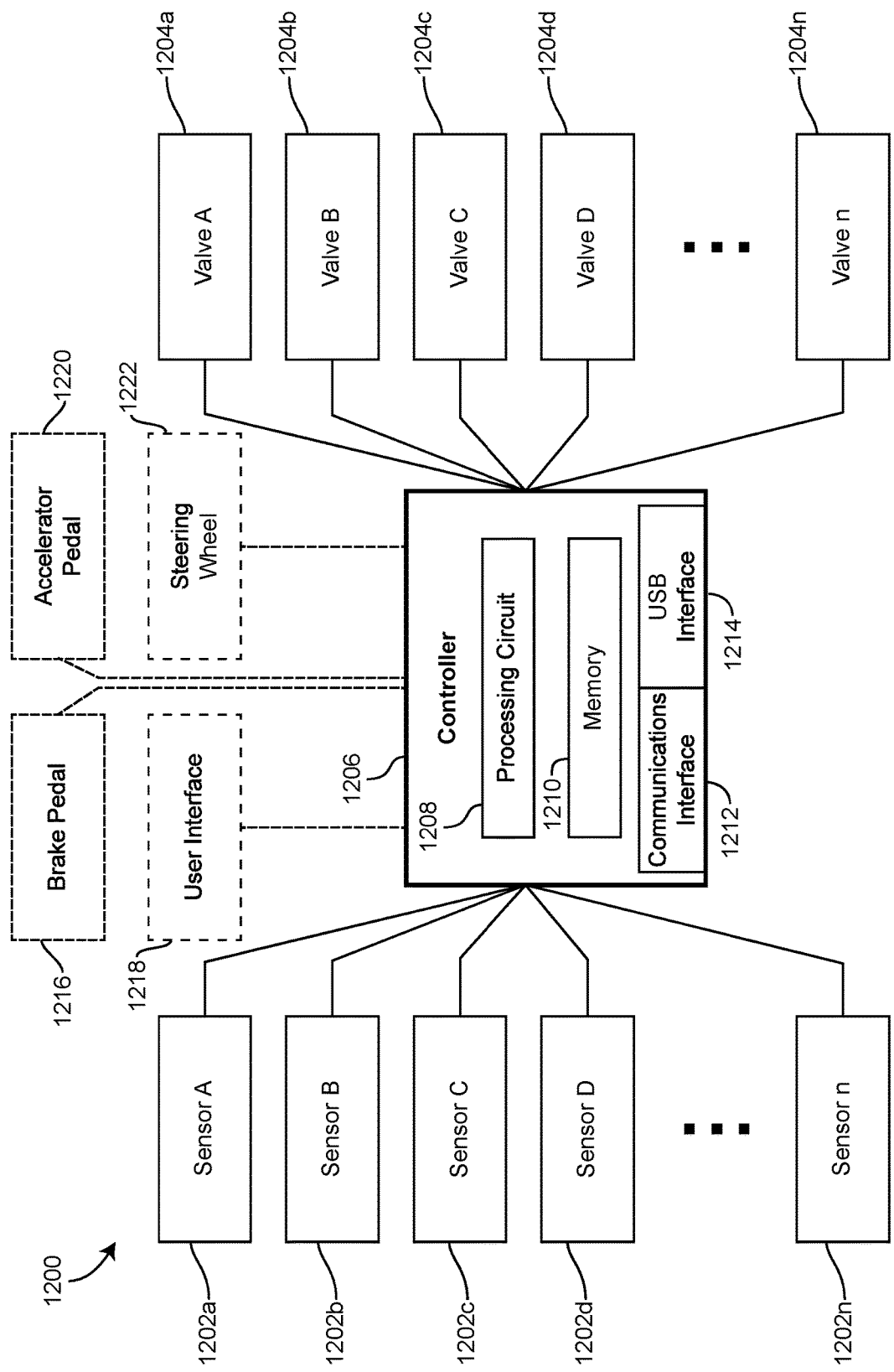
FIG. 12 is a diagram of a controller system, according to an exemplary embodiment.

Referring now to FIG. 12, a diagram of a controller system 1200 is depicted according to an exemplary embodiment. Controller system 1200 is shown to include controller 1206, sensors 1202a-1202n, valves 1204a-1204n, as well as a variety of other inputs. Controller 1206 may receive inputs from sensors 1202a-1202n, brake pedal 1216, user interface 1218, accelerator pedal 1220, or steering wheel 1222. In some embodiments, controller 1206 receives inputs from sensors 1202a-1202n which may be related to dynamics of the vehicle and may be used to determine the dynamics of the vehicle. In some embodiments, valves 1204a-1204n are any of a pressure compensated flow valve and a proportional variable relief valve. In some embodiments, controller 1206 is a chassis controller. In some embodiments, controller 1206 receives inputs from an inertial measurement unit (IMU). For example, one or more of sensors 1202a-1202n may be an IMU, according to some embodiments. In some embodiments, the IMU may measure and relay information to controller 1206 regarding inertial force, angular acceleration, yaw rate, pitch rate, roll rate, etc. In some embodiments the IMU includes one or more gyroscopes and/or accelerometers.

Controller 1206 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 12, controller 1206 includes a processing circuit 1208 and a memory 1210. Processing circuit 1208 may include an ASIC, one or more FPGAs, a DSP, circuits containing one or more processing components, circuitry for supporting a microprocessor, a group of processing components, or other suitable electronic processing components. In some embodiments, processing circuit 1208 is configured to execute computer code stored in memory 1210 to facilitate the activities described herein. Memory 1210 may be any volatile or non-volatile computer-readable storage medium capable of storing data or computer code relating to the activities described herein. According to an exemplary embodiment, memory 1210 includes computer code modules (e.g., executable code, object code, source code, script code, machine code, etc.) configured for execution by processing circuit 1208. Memory 1210 includes various actuation profiles corresponding to modes of operation (e.g., for valves 1204a-1204n, for a transmission, for a drive system, for a vehicle, etc.), according to an exemplary embodiment. In some embodiments, controller 1206 may represent a collection of processing devices (e.g., servers, data centers, etc.). In such cases, processing circuit 1208 represents the collective processors of the devices, and memory 1210 represents the collective storage devices of the devices.

Controller 1206 may also include communications interface 1212 and USB interface 1214. Communications interface 1212 and/or USB interface 1214 may be configured to communicate with another processing device to input or output information from the controller 1206 regarding the operation of the vehicle system, the input from the sensors 1202a-1202n, and the operation of valves 1204a-1204n. In some embodiments, communications interface 1212 and USB interface 1214 are configured to communicate serially with another processing device. Communications interface 1212 and/or USB interface 1214 may communicate with the other processing device serially via serial communications interface, such as SPI (serial peripheral interface), I2C (inter-integrated circuit), FireWire, Ethernet, etc.

Controller 1206 may be configured to calculate the dynamic response of the vehicle based on the inputs from at least one of various sensors 1202a-1202n, brake pedal 1216, user interface 1218, accelerator pedal 1220, and steering wheel 1222. In some embodiments, controller 1206 is configured to calculate the dynamic response of the vehicle periodically, such as at the end of a time step (e.g., every 0.1 second, every 1 second, every 5 seconds etc.). For example, sensor 1202a may transmit information regarding the wheel speed of the vehicle to controller 1206. Controller 1206 may be configured to calculate the dynamic response of the vehicle based on at least one of a lookup table, a model, one or more equations, a multi-body dynamics method, etc. The lookup table, model, equations, and multi-body dynamics method may be stored in memory 1210 and may be accessed and used by processing circuit 1208. In some embodiments, memory 1210 may also store information regarding properties of the vehicle (e.g., axle distance, weight, size, wheel diameter, etc.), required to determine the dynamic response of the vehicle. Processing circuit 1208 may be configured to access and use the information regarding the properties of the vehicle from memory 1210 according to some embodiments. For example, one of sensors 1202a-1202n may be a yaw rate sensor (e.g., a gyroscope) configured to supply controller 1206 with information regarding the yaw rate of the vehicle.

In one example, controller 1206 may receive information from the steering wheel and sensor 1202a regarding an angle of turn of the steering wheel, and a speed of the vehicle. Processing circuit 1208 may receive the information regarding the angle of turn of the steering wheel and the speed of the vehicle and may access memory 1210 to access the stored properties of the vehicle according to some embodiments. In some embodiments, processing circuit 1208 may then calculate lateral acceleration, yaw rate, etc., of the vehicle, or any other dynamic properties of the vehicle relevant to the turn of the vehicle. In some embodiments, processing circuit 1208 may use any of the methods described above (e.g., lookup table, model, equations, multi-body dynamics method, etc.) to determine the dynamic response of the vehicle (i.e., lateral acceleration, yaw rate, turn radius, etc.). In some embodiments, processing circuit 1208 may use a set of threshold values. The set of threshold values may include a low threshold value and a high threshold value. In some embodiments, the set of threshold values relates to a yaw rate (e.g., a low yaw rate threshold value and a high yaw rate threshold value). In some embodiments, the set of threshold values relates to an acceleration or deceleration (e.g., a low acceleration/deceleration threshold value and a high acceleration/deceleration threshold value).

In response to the determined dynamic response of the vehicle, processing circuit 1208 may be further configured to determine an operation of valves 1204a-1204n to achieve a desired dynamic response of the vehicle (e.g., an operation of valves 1204a-1204n to lower a center of gravity of the vehicle). For example, if the processing circuit 1208 determines that the yaw rate exceeds a threshold value, processing circuit 1208 may be configured to adjust the operation of valves 1204a-1204n to restrict the extension of a damper on an inside of a turn of the vehicle. In some embodiments, processing circuit 1208 may determine an operation of valves 1204a-1204n to achieve a certain amount of ride stability, to decrease a rollover moment, to prevent the vehicle from rolling, to prevent the vehicle from pitching, to lower the center of gravity of the vehicle, etc. Processing circuit 1208 may use additional methods to determine the operation of valves 1204a-1204n to achieve the desired dynamic response of the vehicle, according to some embodiments. In some embodiments, processing circuit 1208 may use a lookup table, one or more equations, a graph, a model, a multi-body dynamics method, a set of threshold values, etc., to determine the operation of valves 1204a-1204n to achieve the desired dynamic response of the vehicle.

In some embodiments, processing circuit 1208 may be configured to directly determine the operation of valves 1204a-1204n to achieve the desired dynamic response of the vehicle based on the input information from at least one of sensors 1202a-1202n, brake pedal 1216, user interface 1218, accelerator pedal 1220, and steering wheel 1222. Processing circuit 1208 may use a lookup table, a graph, one or more equations, a model, a set of rules, etc., to determine the operation of valves 1204a-1204n required to achieve the desired dynamic response of the vehicle based on the input information.

In some embodiments, controller 1206 may receive an input from user interface 1218. User interface 1218 may be configured to receive an input from a vehicle operator. User interface 1218 may be a selector panel (e.g., including buttons, switches, displays, etc.), and may receive an input from the vehicle operator to engage or disengage the suspension system or to switch between modes of operation of the suspension system. For example, if the user inputs a command to manually activate or deactivate the suspension system, the controller may be configured to adjust the operation of valves 1204a-1204n to either restrict the flow of the dampers or to allow fluid to flow into and out of the dampers freely. In some embodiments, when the user manually activates the suspension system through the user interface 1218, controller 1206 may be configured to adjust the valves 1204a-1204n to restrict the flow rate out of dampers.

The user interface 1218 may also allow the vehicle operator to select between several pre-determined modes of operation. For examples, the user interface 1218 may allow the vehicle operator to select between highway mode, off-road mode, etc. Each of these modes of operation may have a predetermined operation stored in memory 1210. For example, when in off-road mode, controller 1206 may be configured to adjust the valves 1204a-1204n to allow fluid to flow freely into and out of the dampers using at least one of a different lookup table, set of rules, one or more equations, one or more graphs, models, and multi-body dynamics method as compared to the lookup table set of rules, equations, etc., used when in highway mode. Off-road mode may also include several off-road modes, such as snow mode, mud mode, uneven terrain mode, sand mode, etc. Controller 1206 may be configured to adjust the operation of valves 1204a-1204n differently depending on which mode is selected. In some embodiments, when in off-road mode, processing circuit 1208 may be configured to determine what sort of terrain the vehicle is travelling upon and may adjust operation of valves 1204a-1204n based on the determination of what sort of terrain the vehicle is travelling upon.

In some embodiments, controller 1206 may also be configured to adjust the operation of valves 1204a-1204n, based on disturbances input into the suspension system. For example, processing circuit 1208 may be configured to detect if the vehicle has encountered a bump or any other disturbance by receiving information from one of sensors 1202a-1202n regarding the extension or compression of dampers of the vehicle. A rapid extension or compression of dampers of the vehicle may be indicative of the vehicle hitting a bump or a gulley on the terrain. The processing circuit 1208 may be configured to determine if the vehicle has encountered a disturbance based on at least one of a lookup table, a predictive method, a model, one or more equations, etc. The processing circuit 1208 may be configured to use a control method to adjust the operation of valves 1204a-1204n to stabilize the vehicle. For example, the control method may be a feedback control method, and may receive feedback from sensors 1202a-1202n regarding the dampers of the vehicle.

In some embodiments, controller 1206 may be configured to control valves 1204a-1204n to control an extension or compression of one or more dampers of the vehicle. For example, valves 1204a-1204n may be any of valve 1016a, valve 1016b, valve 904a, valve 904b, valve 716a, valve 716b, etc., and may be configured to adjust a damping of an extension and/or a compression of a damper (e.g., damper 1002a, damper 1002b, damper 914a, damper 914b, damper 702a, damper 702b, damper 406a, damper 406b, damper 416a, damper 416b, damper 206a, damper 206b, etc.) of the vehicle (e.g., vehicle 110). In some embodiments, controller 1206 may adjust the damping of the extension and/or the compression of the damper based on a threshold value. For example, controller 1206 may receive inputs from one or more of sensors 1202a-1202n, brake pedal 1216, user interface 1218, accelerator pedal 1220, steering wheel 1222, etc., and may determine a yaw rate (or an acceleration/deceleration) of the vehicle. Controller 1206 may compare the determined yaw rate of the vehicle to a first yaw rate threshold value (or the determined acceleration/deceleration to a first acceleration/deceleration threshold value), according to some embodiments. If the determined yaw rate of the vehicle exceeds the first yaw rate threshold value (or if the determined acceleration/deceleration exceeds the first acceleration/deceleration threshold value), controller 1206 may control at least one of 1204a-1204n to control at least one of an extension and compression of one of the dampers. Controller 1206 is configured to control a roll of the vehicle in response to the determined yaw rate (or the determined acceleration/deceleration).

In some embodiments, controller 1206 is configured to control only the extension of one or more dampers by controlling valves 1204a-1204n to increase a damping associated with the extension of the one or more dampers. In some embodiments, controller 1206 is configured to control both an extension and a compression of the one or more dampers by controlling valves 1204a-1204n to increase and/or decrease a damping associated with the extension and/or compression of the one or more dampers. When the determined yaw rate falls below the first yaw rate threshold value (or the determined acceleration/deceleration falls below the first acceleration/deceleration threshold value), controller 1206 may control valves 1204*a*-1204*n* to increase and/or decrease the damping associated with extension and/or compression of the one or more dampers. In some embodiments, controller 1206 may be configured to compare the determined yaw rate to a second yaw rate threshold value (or the determined acceleration/deceleration to a second acceleration/deceleration threshold value). In some embodiments, if the determined yaw rate falls below the second yaw rate threshold value (or if the determined acceleration/deceleration falls below the second acceleration/deceleration threshold value), controller 1206 may be configured to decrease the damping associated with extension and/or compression of the one or more dampers.

Figure 13:
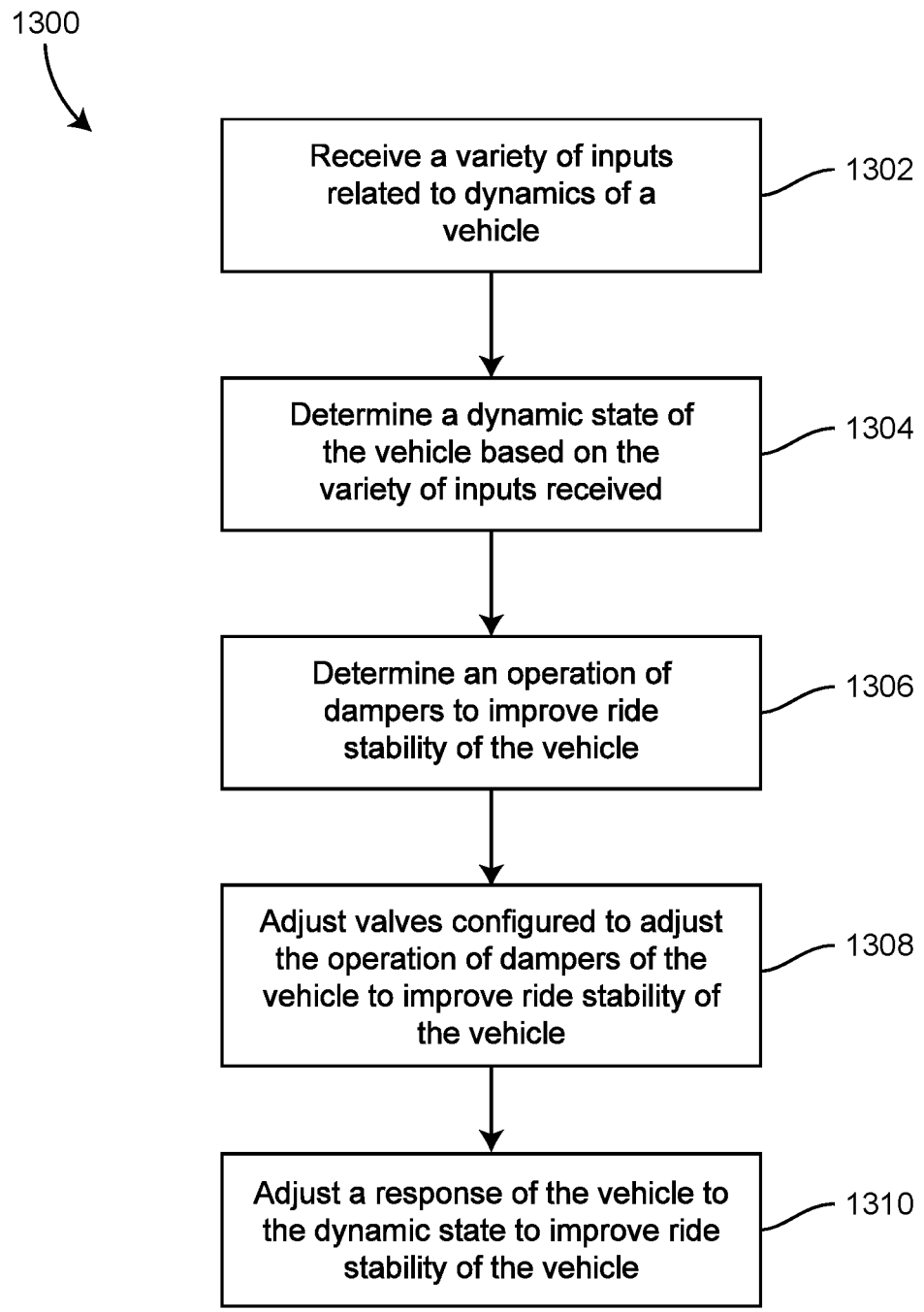
FIG. 13 is a diagram of a method for improving ride stability of a vehicle, according to an exemplary embodiment.

Referring now to FIG. 13, a flow diagram of process 1300 for improving the ride stability of a vehicle is shown, according to an exemplary embodiment. In step 1302, a variety of inputs related to dynamics of the vehicle are received. Step 1302 may be performed by sensors 1202*a*-1202*n*, as well as controller 1206, processing circuit 1208, and memory 1210 according to some embodiments. The inputs related to the dynamics of the vehicle may include but not be limited to information regarding velocity, acceleration, steering wheel angle, damper position, etc. of the vehicle, or any other information which may be collected from sensors on the vehicle, or an ECU, TCU, VECU, etc., of the vehicle. Additionally, information regarding properties of the vehicle (weight, dimensions, etc.) may be received from memory 1210, according to some embodiments.

In step 1304, a dynamic state of the vehicle is determined based on the variety of inputs received which are related to the dynamics of the vehicle. Step 1304 may be performed by controller 1206 and/or processing circuit 1208 according to some embodiments. Processing circuit 1208 and/or controller 1206 may use a variety of methods to determine the dynamic state of the vehicle based on the variety of inputs received. For example, processing circuit 1206 may be configured to use a lookup table, one or more equations, a model, a multi-body dynamics system, one or more graphs, etc., to determine the dynamic state of the vehicle based on the variety of inputs received. In some embodiments, the determined dynamic state of the vehicle is a yaw rate of the vehicle and/or an acceleration or deceleration of the vehicle. The inputs received which are related to the dynamics of the vehicle may be any of a yaw of the vehicle, a yaw rate of the vehicle, a pitch of the vehicle, a pitch rate of the vehicle, a roll of the vehicle, a roll rate of the vehicle, an angular acceleration of the vehicle, a linear acceleration of the vehicle, and a linear deceleration of the vehicle.

In step 1306, an operation of dampers of the vehicle to improve ride stability of the vehicle is determined to improve ride stability of the vehicle. In some embodiments, step 1306 is performed in response to the determined dynamic state of the vehicle. Step 1306 may be performed by controller 1206 and/or processing circuit 1208, according to some embodiments. Improving the ride stability of the vehicle may consist of lowering a center of gravity of the vehicle during turns, acceleration, or deceleration according to some embodiments. In some embodiments, improving the ride stability of the vehicle may consist of stabilizing the vehicle due to disturbances introduced to a suspension system of the vehicle. Controller 1206 and/or processing circuit 1208 may be configured to determine how the dampers of the vehicle should operate to achieve the improved ride stability according to some embodiments. For example, processing circuit 1208 and/or controller 1206 may determine that an inside damper should be restricted from extending in order to lower the center of gravity of the vehicle to improve ride stability during a turn, or during acceleration or deceleration. In some embodiments, the inside damper may be restricted from extending while an outside damper is allowed to compress. In some embodiments, the inside damper is restricted from extending while the outside damper is allowed to compress with a certain damping rate. Step 1306 may also include determining an operation of valves 1204*a*-1204*n* which achieves the operation of dampers to achieve the improved ride stability.

In step 1308, valves 1204*a*-1204*n* are adjusted in order to adjust the operation of the dampers of the vehicle to achieve the improved ride stability of the vehicle. Step 1308 may be performed by controller 1206 according to some embodiments. In some embodiments, controller 1206 may electronically adjust an operation of valves 1204*a*-1204*n* with an electronic actuator. For example, if valves 1204*a*-1204*n* are pressure compensated flow valves, controller 1206 may be configured to adjust the orifice of pressure compensated flow valves by adjusting the needle with the electronic actuator. If valves 1204*a*-1204*n* are proportional variable relief valves, controller 1206 may adjust the operation of proportional variable relief valves by adjusting the stiffness of the second adjustable spring of proportional variable relief valves.

In step 1310, the response of the vehicle is adjusted. Step 1310 may be performed by dampers of the vehicle, according to some embodiments. In some embodiments, the dampers of the vehicle may control the roll and/or pitch of the vehicle to improve the ride stability of the vehicle during turns, acceleration, and deceleration. Dampers of the vehicle may lower the center of gravity of the vehicle to reduce the likelihood of rollover while turning, or to maintain vehicle stability during an event of rapid deceleration or acceleration.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A suspension system for a vehicle, the suspension system comprising:
    a plurality of dampers configured undergo extension and compression, wherein each of the plurality of dampers comprises a valve configured to control at least one of the extension or the compression of one of the plurality of dampers by controlling a fluid flow rate of one of the plurality of dampers; and
    a controller configured to:
        adjust an operation of at least one of the plurality of valves to control the at least one of the extension or the compression of at least one of the plurality of dampers to achieve at least one of a desired roll or a desired pitch by adjusting an operation of one or more of the plurality of valves to adjust an extension or compression damping value of the one or more dampers of the plurality of dampers or by adjusting an operation of one or more of the plurality of valves to adjust a fluid flow rate of the one or more dampers of the plurality of dampers; and
        receive an input regarding at least one of a yaw rate or an acceleration of the vehicle and either compare the yaw rate to a yaw rate threshold value or compare the acceleration to an acceleration threshold value and, if the yaw rate exceeds the yaw rate threshold value or the acceleration exceeds the acceleration threshold value, adjust an operation of at least one of the plurality of valves to restrict the extension or compression of at least one of the plurality of dampers to achieve at least one of the desired roll or the desired pitch.

2. A suspension system for a vehicle, the suspension system comprising:
    plurality of dampers configured undergo extension and compression, wherein each of the plurality of dampers comprises a valve configured to control at least one of the extension or the compression of one of the plurality of dampers by controlling a fluid flow rate of one of the plurality of dampers; and
    a controller configured to:
        adjust an operation of at least one of the plurality of valves to control the at least one of the extension or the compression of at least one of the plurality of dampers to achieve at least one of a desired roll or a desired pitch by adjusting an operation of one or more of the plurality of valves to adjust an extension or compression damping value of the one or more dampers of the plurality of dampers or by adjusting an operation of one or more of the plurality of valves to adjust a fluid flow rate of the one or more dampers of the plurality of dampers;
        restrict an extension or compression of one or more inside dampers of the plurality of dampers during a turn of the vehicle;

restrict an extension or compression of one or more front dampers of the plurality of dampers during an acceleration of the vehicle; an restrict an extension or compression of one or more rear dampers of the plurality of dampers during a deceleration of the vehicle.

3. The suspension system of claim 1, wherein the plurality of dampers are configured extend and compress based on at least one of the yaw rate and the acceleration of the vehicle.

4. The suspension system of claim 1, wherein the plurality of valves are pressure compensated flow valves and are configured to control a flow rate of fluid entering or exiting at least one of the plurality of dampers.

* * * * *